(12) United States Patent
Okada et al.

(10) Patent No.: US 11,608,897 B2
(45) Date of Patent: Mar. 21, 2023

(54) SLIDE COMPONENT

(71) Applicant: EAGLE INDUSTRY CO., LTD., Tokyo (JP)

(72) Inventors: Tetsuzo Okada, Tokyo (JP); Masatoshi Itadani, Tokyo (JP); Takeshi Hosoe, Tokyo (JP); Yuki Sasaki, Tokyo (JP); Keita Kajihara, Tokyo (JP)

(73) Assignee: EAGLE INDUSTRY CO., LTD.

( * ) Notice: Subject to any disclaimer, the term of this patent is extended or adjusted under 35 U.S.C. 154(b) by 49 days.

(21) Appl. No.: 17/257,260

(22) PCT Filed: Jul. 30, 2019

(86) PCT No.: PCT/JP2019/029771
§ 371 (c)(1),
(2) Date: Dec. 30, 2020

(87) PCT Pub. No.: WO2020/027102
PCT Pub. Date: Feb. 6, 2020

(65) Prior Publication Data
US 2021/0364034 A1 Nov. 25, 2021

(30) Foreign Application Priority Data
Aug. 1, 2018 (JP) .............................. JP2018-144640

(51) Int. Cl.
*F16J 15/34* (2006.01)
*F16C 17/04* (2006.01)
(Continued)

(52) U.S. Cl.
CPC ......... *F16J 15/3412* (2013.01); *F16C 17/045* (2013.01); *F16C 33/723* (2013.01); *F16C 33/743* (2013.01)

(58) Field of Classification Search
CPC .... F16J 15/00; F16J 15/16; F16J 15/50; F16J 15/52; F16J 15/34; F16J 15/3404;
(Continued)

(56) References Cited

U.S. PATENT DOCUMENTS 3,085,808 A 4/1963 Williams ....................... 277/388
3,232,680 A 2/1966 Clark ............................ 384/110
(Continued)

FOREIGN PATENT DOCUMENTS

CN 2534429 2/2003 ............... F16J 15/40
CN 101749431 6/2010 ............... F16J 15/34
(Continued)

OTHER PUBLICATIONS

Definition of groove by Merriam Webster.
(Continued)

*Primary Examiner* — Nathan Cumar
(74) *Attorney, Agent, or Firm* — Hayes Soloway P.C.

(57) ABSTRACT

The purpose of the present invention is to provide a slide component that can exhibit sealing performance and lubricity regardless of rotating direction. A pair of slide components 4, 7 that slide relative to each other have sliding faces S that slide relative to each other, and a sealed fluid-side periphery 16 and a leakage-side periphery 15. The sliding face S of at least one slide component 4 of the pair of slide components 4, 7 includes: a fluid introduction groove 13 in communication with the sealed fluid-side periphery 16; a first pressure generation mechanism 12 of which one end is in communication with the fluid introduction groove 13 and the other end is surrounded by a land portion R1; and a second pressure generation mechanism 11 of which one end is in communication with the leakage-side periphery 15 and the other end is surrounded by an annular land portion R2. The fluid introduction groove 13 and the other end 12e of the (Continued)

first pressure generation mechanism 12 include overlapping portions Lp overlapping circumferentially.

11 Claims, 9 Drawing Sheets

(51) Int. Cl.
*F16C 33/72* (2006.01)
*F16C 33/74* (2006.01)

(58) Field of Classification Search
CPC .... F16J 15/3416; F16J 15/342; F16J 15/3424; F16J 15/3412; F16C 17/00; F16C 17/04; F16C 17/045; F16C 32/00; F16C 32/06; F16C 33/00; F16C 33/72; F16C 33/723; F16C 33/74; F16C 33/741; F16C 33/743; F16C 33/745
USPC ........................................................ 277/400
See application file for complete search history.

(56) References Cited

U.S. PATENT DOCUMENTS

| | | | |
|---|---|---|---|
| 3,466,052 A | 4/1966 | Ludwig | |
| 3,410,565 A | 11/1968 | Williams | 277/348 |
| 3,499,653 A | 3/1970 | Gardner | 277/27 |
| 3,527,465 A | 9/1970 | Guinard | 277/400 |
| 3,656,227 A | 4/1972 | Weinand | 29/530 |
| 3,804,424 A | 4/1974 | Gardner | 277/27 |
| 4,406,466 A | 9/1983 | Geary, Jr. | 277/347 |
| 4,486,026 A | 12/1984 | Furumura et al. | 277/80 |
| 5,092,612 A | 3/1992 | Victor | 277/400 |
| 5,201,531 A | 4/1993 | Lai | F16J 15/3412 |
| 5,222,743 A | 6/1993 | Goldswain | 277/400 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,498,007 A | 3/1996 | Kulkarni | 277/366 |
| 5,501,470 A | 3/1996 | Fuse | 277/400 |
| 5,556,111 A | 9/1996 | Sedy | 277/96.1 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,189,896 B1 | 2/2001 | Dickey et al. | F16L 17/06 |
| 6,446,976 B1 | 9/2002 | Key | 277/367 |
| 6,817,766 B2 | 11/2004 | Gomyo | F16C 32/06 |
| 7,510,330 B2 | 3/2009 | Obara | F16C 32/06 |
| 7,568,839 B2 | 8/2009 | Gotoh et al. | F16C 32/06 |
| 7,758,051 B2 | 7/2010 | Roberts-Haritonov et al. F16J 15/34 | |
| 9,062,775 B2 | 6/2015 | Short et al. | F16J 15/34 |
| 9,371,912 B2 | 6/2016 | Hosoe et al. | F16J 15/34 |
| 9,587,745 B2 | 3/2017 | Itadani et al. | F16J 15/3412 |
| 9,677,670 B2 | 6/2017 | Itadani et al. | F16J 15/34 |
| 9,829,109 B2 | 11/2017 | Itadani et al. | F16J 15/3412 |
| 9,951,873 B2 | 4/2018 | Inoue et al. | F16J 15/34 |
| 9,982,784 B2 | 5/2018 | Osada et al. | F16J 15/34 |
| 10,072,759 B2 | 9/2018 | Inoue et al. | F16J 15/34 |
| 10,113,648 B2 | 10/2018 | Inoue et al. | F16J 15/34 |
| 10,337,620 B2 | 7/2019 | Tokunaga et al. | F16J 15/342 |
| 10,473,220 B2 | 11/2019 | Tokunaga et al. | F16J 15/34 |
| 10,487,948 B2 | 11/2019 | Inoue et al. | F16J 15/342 |
| 10,495,228 B2 | 12/2019 | Itadani et al. | F16J 15/34 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,125,335 B2 | 9/2021 | Kimura et al. | F16J 15/34 |
| 2002/0093141 A1 | 7/2002 | Wang | 277/358 |
| 2003/0178781 A1 | 9/2003 | Tejima | |
| 2004/0080112 A1 | 4/2004 | Tejima | 277/306 |
| 2005/0141789 A1 | 6/2005 | Kita et al. | F16C 32/06 |
| 2005/0212217 A1 | 9/2005 | Tejima | 277/399 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0189294 A1 | 7/2013 | Koelle et al. | F16J 15/34 |
| 2013/0209011 A1 | 8/2013 | Tokunaga | F16C 32/0633 |
| 2015/0115537 A1 | 4/2015 | Tokunaga | F16J 15/34 |
| 2015/0123350 A1* | 5/2015 | Itadani | F16J 15/3412 277/400 |
| 2015/0184752 A1* | 7/2015 | Itadani | F16J 15/3412 277/400 |
| 2015/0226334 A1* | 8/2015 | Itadani | F16J 15/3424 277/400 |
| 2015/0240950 A1* | 8/2015 | Takahashi | F16J 15/363 277/377 |
| 2015/0260292 A1 | 9/2015 | Inoue et al. | F16J 15/342 |
| 2015/0377297 A1 | 12/2015 | Tokunaga et al. | F16C 33/748 |
| 2016/0033045 A1 | 2/2016 | Itadani et al. | F16J 15/3412 |
| 2016/0097457 A1 | 4/2016 | Sun et al. | F16J 15/34 |
| 2017/0198814 A1 | 7/2017 | Colombo et al. | F16J 15/3412 |
| 2017/0234431 A1 | 8/2017 | Katori et al. | F16J 15/3412 |
| 2018/0073394 A1* | 3/2018 | Tokunaga | F02C 7/06 |
| 2018/0128377 A1* | 5/2018 | Tokunaga | F16J 15/34 |
| 2018/0128378 A1 | 5/2018 | Tokunaga et al. | F16J 15/342 |
| 2019/0178386 A1 | 6/2019 | Arai | F16J 15/3496 |
| 2019/0301522 A1 | 10/2019 | Negishi et al. | F16C 17/026 |

FOREIGN PATENT DOCUMENTS

| | | | |
|---|---|---|---|
| CN | 101776152 | 7/2010 | F16J 15/48 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 106439037 | 2/2017 | F16J 15/34 |
| CN | 206017723 | 3/2017 | F16J 15/16 |
| CN | 107166036 | 9/2017 | F16J 15/16 |
| CN | 107532724 | 1/2018 | F16J 15/34 |
| CN | 108506494 | 9/2018 | F16J 15/34 |
| DE | 36 19 489 | 12/1987 | F16J 15/34 |
| DE | 4407453 | 9/1995 | F16C 17/08 |
| EP | 0637706 | 8/1993 | F16J 15/34 |
| EP | 0896163 | 2/1999 | F16C 33/10 |
| EP | 2520835 | 11/2012 | F16J 15/34 |
| EP | 2626604 | 8/2013 | F16J 15/34 |
| EP | 2977655 | 1/2016 | F16J 15/34 |
| EP | 3091258 | 11/2016 | F16J 15/34 |
| EP | 3299686 | 3/2018 | F16J 15/34 |
| EP | 3922872 | 12/2021 | F16J 15/34 |
| EP | 3926187 | 12/2021 | F16C 17/04 |
| EP | 3943765 | 1/2022 | F16C 17/04 |
| EP | 3926188 | 12/2022 | F16C 17/04 |
| JP | 36-6305 | 5/1961 | |
| JP | S49-33614 | 9/1974 | F16J 15/34 |
| JP | S54-77305 | 6/1979 | B06B 9/10 |
| JP | S55-177549 | 12/1980 | F16J 15/16 |
| JP | S57-146955 | 9/1982 | F16J 15/34 |
| JP | 58-109771 | 6/1983 | F16J 15/34 |
| JP | 58-137667 | 8/1983 | F16J 15/40 |
| JP | S59-58252 | 4/1984 | F16J 15/34 |
| JP | S60-107461 | 7/1985 | B63H 23/36 |
| JP | S6182177 | 5/1986 | F16J 15/34 |
| JP | S62-37572 | 2/1987 | F16J 51/34 |
| JP | S63-033027 | 3/1988 | F16C 33/46 |
| JP | S63-190975 | 8/1988 | F16J 15/34 |
| JP | H01133572 | 9/1989 | F16J 15/34 |
| JP | H02236067 A | 9/1990 | |
| JP | 3-14371 | 2/1991 | F16J 15/34 |
| JP | 3-35372 | 4/1991 | F16J 15/34 |
| JP | 3-41267 | 4/1991 | F16J 15/34 |
| JP | 3-41268 | 4/1991 | F16J 15/34 |
| JP | H04-73 | 1/1992 | F16J 15/34 |
| JP | H04-145267 | 5/1992 | F16J 15/34 |
| JP | H04-96671 | 8/1992 | F16J 15/34 |
| JP | H05-322050 | 12/1993 | F16J 15/34 |
| JP | H0590048 U | 12/1993 | |

(56) References Cited

FOREIGN PATENT DOCUMENTS

| | | | |
|---|---|---|---|
| JP | H07-55016 | 3/1995 | ............... F16J 15/34 |
| JP | H08-89489 | 4/1996 | ............... A61B 5/05 |
| JP | H09-503276 | 3/1997 | ............... F16J 15/34 |
| JP | H09-329247 | 12/1997 | ............... F16J 15/34 |
| JP | H10-38093 | 2/1998 | ............... F16J 15/34 |
| JP | H10-281299 | 10/1998 | ............... F16J 15/34 |
| JP | 2000-179543 | 6/2000 | ............... F16C 17/10 |
| JP | 2001-295833 | 10/2001 | ............... F16C 17/04 |
| JP | 2001-317638 | 11/2001 | ............... F16J 15/34 |
| JP | 2003-161322 | 6/2003 | ............... F16C 33/10 |
| JP | 2003-343741 | 12/2003 | ............... F16J 15/34 |
| JP | 2004003578 A | 1/2004 | |
| JP | 2005-188651 | 7/2005 | ............... F16J 15/34 |
| JP | 2005-351473 | 12/2005 | ............... F16C 33/74 |
| JP | 2006-9828 | 1/2006 | ............... F16C 17/02 |
| JP | 2006-022834 | 1/2006 | ............... F16J 15/34 |
| JP | 2006-77899 | 3/2006 | ............... F16J 15/34 |
| JP | 2008-144864 | 6/2008 | ............... F16C 33/10 |
| JP | 2009-250378 | 10/2009 | ............... F16J 15/34 |
| JP | 2010133496 A | 6/2010 | |
| JP | 2010-216587 | 9/2010 | ............... F16J 15/34 |
| JP | 2011-185292 | 9/2011 | ............... F16J 15/34 |
| JP | 2012-2295 | 1/2012 | ............... F16J 15/34 |
| JP | 5271858 | 5/2013 | ............... F16J 15/34 |
| JP | 2016-80090 | 5/2016 | ............... F16J 15/34 |
| JP | 2017-141961 | 8/2017 | ............... F16J 15/34 |
| JP | 6444492 | 12/2018 | ............... F16J 15/34 |
| JP | 2019-15401 | 1/2019 | ............... F16J 15/34 |
| WO | WO 95/06832 | 3/1995 | ............... F16J 15/34 |
| WO | WO 2012/046749 | 4/2012 | ............... F16J 15/34 |
| WO | 2014024742 A1 | 2/2014 | |
| WO | WO 2014/050920 | 4/2014 | ............... F16J 15/34 |
| WO | 2014103630 A1 | 7/2014 | |
| WO | WO 2014/112455 | 7/2014 | ............... F16J 15/34 |
| WO | WO 2014/148316 | 9/2014 | ............... F16J 15/34 |
| WO | WO 2014/174725 | 10/2014 | ............... F16J 15/34 |
| WO | WO 2016/009408 | 1/2016 | ............... F16J 15/34 |
| WO | WO 2016/035860 | 3/2016 | ............... F16J 15/34 |
| WO | 2016167262 A1 | 10/2016 | |
| WO | 2016186019 A1 | 11/2016 | |
| WO | WO2016203878 | 12/2016 | ............... F16J 15/34 |
| WO | WO 2017/002774 | 1/2017 | ............... F16J 15/34 |
| WO | WO 2018/034197 | 2/2018 | ............... F16J 15/34 |
| WO | WO 2018/105505 | 6/2018 | ............... F16J 15/34 |
| WO | WO2018139231 | 8/2018 | ............... F16J 15/34 |
| WO | WO2018139232 | 8/2018 | ............... A16C 33/10 |

OTHER PUBLICATIONS

Chinese Office Action issued in application No. 201380070532.6 (with translation), dated Jan. 28, 2016 (13 pgs).
Chinese Office Action issued in application No. 201380070532.6 (with translation), dated Sep. 20, 2016 (12 pgs).
Second Office Action issued by the State Intellectual Property Office of China, dated Aug. 29, 2016, for Chinese counterpart application No. 201480002574.0, 8 pages.
First Notification of Reason for Refusal issued by the State Intellectual Property Office of China, dated Dec. 24, 2015, with a search report for Chinese counterpart application No. 201480002574.0, 11 pages.
Office Action issued in U.S. Appl. No. 14/431,733, dated Apr. 29, 2016 (22 pgs).
Office Action issued in U.S. Appl. No. 14/431,733, dated Aug. 18, 2017 (13 pgs).
Office Action issued in U.S. Appl. No. 14/431,733, dated Mar. 31, 2017 (14 pgs).
Office Action issued in U.S. Appl. No. 14/431,733, dated Oct. 6, 2016 (12 pgs).
Office Action issued in U.S. Appl. No. 15/419,989, dated Jan. 26, 2018 (20 pgs).
Office Action issued in U.S. Appl. No. 15/419,970, dated May 11, 2018 (17 pgs).
Office Action issued in U.S. Appl. No. 15/842,862, dated Jan. 23, 2018 (21 pgs).
Office Action issued in U.S. Appl. No. 15/842,862, dated Jun. 5, 2019 (37 pgs).
Office Action issued in U.S. Appl. No. 15/842,855, dated Mar. 12, 2020 (11 pgs).
Office Action issued in U.S. Appl. No. 15/842,855, dated Jun. 29, 2020, 16 pages.
Office Action issued in U.S. Appl. No. 15/842,859, dated Mar. 31, 2020 (10 pgs).
Office Action issued in U.S. Appl. No. 15/842,859, dated Apr. 8, 2020 (12 pgs).
Notice of Allowance issued in U.S. Appl. No. 15/419,970, dated Aug. 9, 2018 (16 pgs).
Notice of Allowance issued in U.S. Appl. No. 14/431,733, dated Feb. 23, 2018 (22 pgs).
Notice of Allowance issued in U.S. Appl. No. 15/419,989, dated Jul. 23, 2018 (11 pgs).
Notice of Allowance issued in U.S. Appl. No. 15/842,862, dated Sep. 30, 2019, 15 pages.
Japanese Office Action (w/translation) issued in application 2018-159877, dated Jun. 13, 2019 (7 pgs).
International Search Report issued in application No. PCT/JP2013/084029, dated Mar. 25, 2014 (4 pgs).
International Preliminary Report on Patentability issued in application No. PCT/JP2013/084029, dated Nov. 5, 2015 (8 pgs).
International Search Report and Written Opinion issued in PCT/JP2014/050402, dated Feb. 10, 2014, with English translation, 12 pages.
International Preliminary Report on Patentability issued in PCT/JP2014/050402. dated Jul. 21, 2015, 4 pages.
International Search Report and Written Opinion issued in PCT/JP2019/045728, dated Dec. 17, 2019, with English translation, 13 pages.
International Preliminary Report on Patentability issued in PCT/JP2019/045728, dated May 25, 2021, 7 pages.
International Search Report and Written Opinion issued in PCT/JP2019/047890, dated Feb. 16, 2020. with English translation, 13 pages.
International Preliminary Report on Patentability issued in PCT/JP2019/047890, dated Aug. 10, 2021, 7 pages.
International Search Report and Written Opinion issued in PCT/JP2019/049870, dated Mar. 10, 2020, with English translation, 13 pages.
International Preliminary Report on Patentability issued in PCT/JP2019/049870, dated Jun. 16, 2021, 7 pages.
International Search Report and Written Opinion issued in PCT/JP2020/005260, dated Apr. 7. 2020, with English translation, 16 pages.
International Preliminary Report on Patentability issued in PCT/JP2020/005260, dated Aug. 10, 2021, 9 pages.
International Search Report and Written Opinion issued in PCT/JP2020/006421, dated Apr. 21, 2020, with English translation, 13 pages.
International Preliminary Report on Patentability issued in PCT/JP2020/006421, dated Aug. 10, 2021, 6 pages.
International Search Report and Written Opinion issued in PCT/JP2020/017170, dated Jun. 2, 2020, with English translation, 13 pages.
International Preliminary Report on Patentability issued in PCT/JP2020/027005, dated Feb. 1, 2022, 4 pages.
International Search Report and Written Opinion issued in PCT/JP2020/027005, dated Sep. 1, 2020, with English translation, 11 pages.
International Preliminary Report on Patentability issued in PCT/JP2019/032723, dated Mar. 2, 2021, 6 pages.
International Search Report and Written Opinion issued in PCT/JP2019/032723, dated Nov. 5, 2019, with English translation, 17 pages.
International Preliminary Report on Patentability issued in PCT/JP2019/029771, dated Feb. 2, 2021, 7 pages.

(56) References Cited

OTHER PUBLICATIONS

International Search Report and Written Opinion issued in PCT/JP2019/029771, dated Sep. 17, 2019, with English translation, 20 pages.
International Preliminary Report on Patentability issued in PCT/JP2019/040209, dated Apr. 27, 2021, 6 pages.
International Search Report and Written Opinion issued in PCT/JP2019/040209, dated Dec. 24, 2019, with English translation, 17 pages.
International Preliminary Report on Patentability issued in PCT/JP2019/038155, dated Mar. 23, 2021, 6 pages.
International Search Report and Written Opinion issued in PCT/JP2019/038155, dated Nov. 19, 2019, with English translation, 18 pages.
European Official Action issued in related European Patent Application Serial No. 19850900.2, dated Mar. 31, 2022, 11 pages.
European Official Action issued in related European Patent Application Serial No. 19843273.4, dated Mar. 24, 2022, 9 pages.
International Search Report (ISR) dated Sep. 17, 2019, issued for International application No. PCT/JP2019/029771. (2 pages).
U.S. Appl. No. 17/259,336, filed Jan. 11, 2021, Imura.
U.S. Appl. No. 17/275,505, filed Mar. 11, 2021, Tokunaga et al.
U.S. Appl. No. 17/277,282, filed Mar. 17, 2021, Tokunaga.
U.S. Appl. No. 17/296,466, filed May 24, 2021, Inoue et al.
U.S. Appl. No. 17/413,466, filed Jun. 11, 2021, Imura et al.
U.S. Appl. No. 17/420,660, filed Jul. 2, 2021, Suzuki et al.
U.S. Appl. No. 17/428,909, filed Aug. 5, 2021, Tokunaga et al.
U.S. Appl. No. 17/429,896, filed Aug. 10, 2021, Suzuki et al.
U.S. Appl. No. 17/628,158, filed Jan. 18, 2022, Inoue et al.
Chinese Office Action issued in application No. 201980087670.2 (with translation), dated Jul. 1, 2022 (17 pgs).
Chinese Office Action issued in application No. 201980043720.7 (with translation), dated Jun. 6, 2022 (12 pgs).
Chinese Office Action issued in application No. 202080014381.2 (with translation), dated Aug. 11, 2022 (15 pgs).
Chinese Office Action issued in application No. 202080012994.2 (with translation), dated Aug. 29, 2022 (14 pgs).
European Official Action issued in related European Patent Application Serial No. 19869466.3, dated May 19, 2022, 9 pages.
European Official Action issued in related European Patent Application Serial No. 19876680.0, dated Jun. 3, 2022, 8 pages.
European Official Action issued in related European Patent Application Serial No. 19888532.9, dated Jul. 8, 2022, 7 pages.
European Official Action issued in related European Patent Application Serial No. 19899646.4, dated Aug. 12, 2022, 9 pages.
Korean Office Action issued in application No. 10-2020-7037305 (with translation), dated Jun. 24, 2022 (17 pgs).
Korean Office Action issued in application No. 10-2021-7002193 (with translation), dated Jul. 18, 2022 (13 pgs).
Chinese Office Action issued in application No. 201980065303.2 (with translation), dated Oct. 10, 2022 (13 pgs).
European Official Action issued in related European Patent Application Serial No. 19914452.8, dated Oct. 5, 2022, 10 pages.
European Official Action issued in related European Patent Application Serial No. 20756664.7, dated Oct. 14, 2022, 8 pages.
European Official Action issued in related European Patent Application Serial No. 20759684.2, dated Oct. 17, 2022, 7 pages.
Korean Office Action issued in application No. 10-2021-7019130 (with translation), dated Oct. 22, 2022 (13 pgs).
Korean Office Action issued in application No. 10-2021-7007194 (with translation), dated Nov. 7, 2022 (14 pgs).

* cited by examiner

SLIDE COMPONENT

CROSS-REFERENCE TO RELATED APPLICATIONS

This application is the U.S. National Phase under 35 U.S.C. § 371 of International Application PCT/JP2019/029771, filed Jul. 30, 2019, which claims priority to Japanese Patent Application No. JP2018-144640, filed Aug. 1, 2018. The International Application was published under PCT Article 21(2) in a language other than English.

TECHNICAL FIELD

The present invention relates to a slide component suitable for, for example, mechanical seals, bearings, and other slide parts. In particular, the present invention relates to a slide component such as a seal ring, for example, oil seals used for gear boxes for turbochargers or aircraft engines, or bearings required to reduce friction by interposing a fluid between sliding faces and to prevent leakage of the fluid from the sliding faces.

BACKGROUND ART

For example, as shown in FIG. 9, it is known that, of a pair of slide components that slide relative to each other, in a sliding face S of a rotating-side sealing ring 4 on a sealed fluid side, a fluid introduction groove 43 configured so as to be in communication with a sealed fluid-side periphery and not to be in communication with a leakage-side periphery, a positive pressure generation groove 42 in communication with the fluid introduction groove 43, and a dynamic pressure generation groove 41 configured so as to be in communication with the leakage-side periphery and not to be in communication with the sealed fluid-side periphery are provided. Thereby, in the low-speed rotation state, the fluid is actively introduced into the sliding face by the fluid introduction groove 43, and it is possible to lubricate the sliding face S. Moreover, in the high-speed rotation state of the rotating-side sealing ring such as a stationary operation, by the dynamic pressure generated by the dynamic pressure generation groove 41, a slight gap is formed between the sliding faces of the rotating-side sealing ring and a stationary-side sealing ring, and the sliding face can be brought into a fluid lubrication state to have very low friction. At the same time, the fluid existing on the leakage side is pumped toward the sealed fluid side, and therefore it is possible to prevent the fluid on the sealed fluid side from leaking to the leakage side. (For example, see Patent Document 1.)

CITATION LIST

Patent Document

Patent Document 1: WO 2016/167262 A (FIG. 7)

SUMMARY OF THE INVENTION

Problem to be Solved by the Invention

However, in the conventional art of the above patent document 1, the case where the rotating-side sealing ring 4 is rotated in a counterclockwise direction reverse to the arrow in FIG. 9 was not fully considered. That is, when the rotating-side sealing ring 4 is reversely rotated, a spiral groove 41 cannot generate enough dynamic pressure, and therefore the spiral groove 41 cannot sufficiently pump the fluid on the leakage side toward the sealed fluid side. But, in the case of reverse rotation, a positive pressure generation groove 42 reversely generates negative pressure, and the fluid from the spiral groove 41 is sucked in the positive pressure generation groove 42 having negative pressure, and therefore it is possible to compensate deterioration in pumping action of the spiral groove 41. However, a circumferential gap CH in a leakage area between the adjacent positive pressure generation grooves 42 is not affected by the negative pressure of the positive pressure generation groove 42, and therefore it becomes a leakage area where the fluid flows from the sealed fluid side to the leakage side. Therefore, in a case where the spiral groove 41 cannot generate enough dynamic pressure as in the case of reverse rotation, it is impossible to push back the fluid flowing through the leakage area CH, and it was impossible to sufficiently keep sealing performance.

The present invention has been made to solve such a problem, and an object thereof is to provide a slide component that can exhibit sealing performance regardless of rotating direction.

Means for Solving Problem

To solve the above problem, a slide component according to a first embodiment of the present invention is a pair of slide components that slide relative to each other, and is characterized in that:

the pair of slide components have sliding faces that slide relative to each other, a sealed fluid-side periphery, and a leakage-side periphery, the sliding face of at least one slide component of the pair of slide components includes: a fluid introduction groove in communication with the sealed fluid-side periphery;

a first pressure generation mechanism of which one end is in communication with the fluid introduction groove and the other end is surrounded by a land portion; and a second pressure generation mechanism of which one end is in communication with the leakage-side periphery and the other end is surrounded by an annular land portion, and the fluid introduction groove and the other end of the first pressure generation mechanism include overlapping portions overlapping circumferentially.

According to the first aspect, the fluid is actively introduced into the sliding face by the fluid introduction groove, and it is possible to lubricate the sliding face. And, the fluid introduction groove and the end part of the first pressure generation mechanism include the overlapping portions overlapping circumferentially, thereby capable of narrowing the leakage area, and therefore it is possible to reduce leakage.

The slide component according to a second aspect of the present invention is characterized in that:

the fluid introduction groove has an inclined wall part facing the other end of the first pressure generation mechanism; and the inclined wall part is inclined to a direction to approach the one end of the first pressure generation mechanism with respect to a radial axis connecting an intersection point of the inclined wall part and the sealed fluid-side periphery and a center of one of the slide components.

According to the second aspect, since the inclined wall part of the fluid introduction groove is inclined to the direction to approach the first pressure generation mechanism with respect to the radial axis connecting the intersection point of the inclined wall part and the sealed fluid-side periphery and the center of the one slide component, it is possible to easily form the overlapping portion and to narrow the leakage area, and therefore it is possible to reduce leakage.

The slide component according to a third aspect of the present invention is characterized in that the fluid introduction groove and the first pressure generation mechanism are arranged nearer the sealed fluid-side periphery than the annular land portion.

According to the third aspect, the fluid introduction groove and the first pressure generation mechanism are arranged nearer the sealed fluid-side periphery than the annular land portion, thereby the first pressure generation mechanism and the second pressure generation mechanism are separated by the annular land portion, and therefore it is possible to prevent interference of the first pressure generation mechanism and the second pressure generation mechanism, and leakage does not occur even at a standstill.

The slide component according to a fourth aspect of the present invention is characterized in that the fluid introduction groove is formed into a trapezoidal shape.

According to the fourth aspect, it is possible to easily form the overlapping portion by using an oblique side of the trapezoidal shape and to narrow the leakage area, and therefore it is possible to reduce leakage.

The slide component according to a fifth aspect of the present invention is characterized in that the fluid introduction groove is formed into a triangular shape.

According to the fifth aspect, since the triangular fluid introduction groove can be reduced in its radial width, it is possible to increase the overlapping portion of the fluid introduction groove and the first pressure generation mechanism even in a narrow space and to narrow the leakage area, and therefore it is possible to reduce leakage.

The slide component according to a sixth aspect of the present invention is characterized in that the first pressure generation mechanism and the second pressure generation mechanism consist of groove parts.

According to the sixth aspect, the first pressure generation mechanism and the second pressure generation mechanism can be easily formed.

The slide component according to a seventh aspect of the present invention is characterized in that the first pressure generation mechanism and the second pressure generation mechanism consist of a dimple group.

According to the seventh aspect, the first pressure generation mechanism and the second pressure generation mechanism that have a desired shape can be easily configured by the dimple group.

The slide component according to an eighth aspect of the present invention is characterized in that the depth of the fluid introduction groove is deeper than the depth of the first pressure generation mechanism.

According to the eighth aspect, the fluid introduction groove takes in the fluid from the sealed fluid side, and even when a fluid lubrication state is not sufficient in a low-speed rotation state such as at the starting time, it is possible to supply the fluid to the sliding face and to contribute to lubrication of the sliding face.

The slide component according to a ninth aspect of the present invention is characterized in that the depth of the fluid introduction groove is same as the depth of the first pressure generation mechanism.

According to the ninth aspect, it is possible to reduce the cross-sectional area of the leakage area by reducing the cross-sectional area of the fluid introduction groove, and therefore it is possible to reduce leakage.

DESCRIPTION OF EMBODIMENTS

Hereinafter with reference to the drawings, modes for carrying out the present invention will be described illustratively based on embodiments. However, the dimensions, materials, shapes, relative arrangements, and others of components described in the embodiments are not intended to limit the scope of the present invention only to them unless otherwise described explicitly.

First Embodiment

Figure 1:
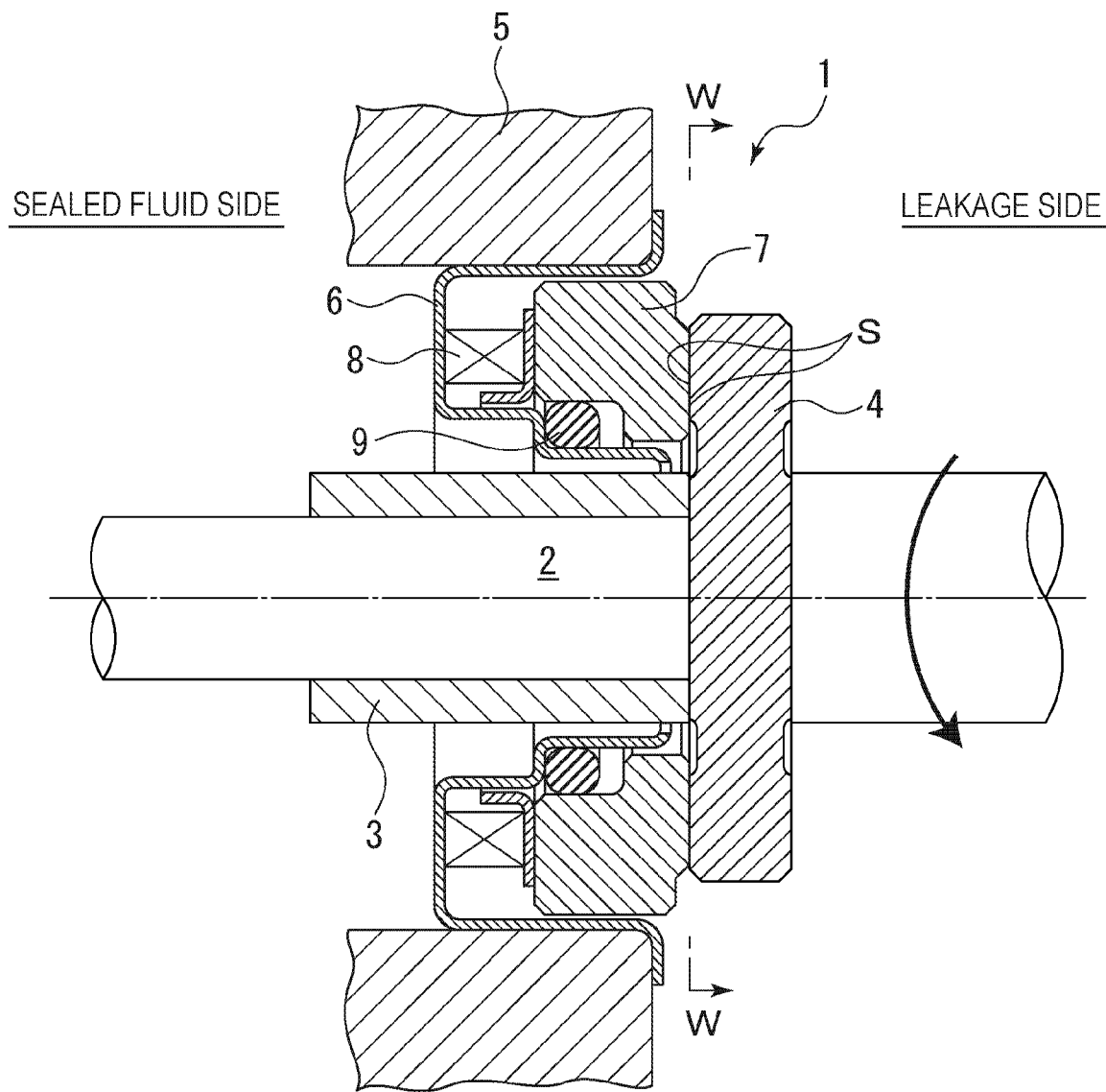
FIG. 1 is a vertical cross-sectional view showing an example of a mechanical seal according to a first embodiment.
Figure 2:
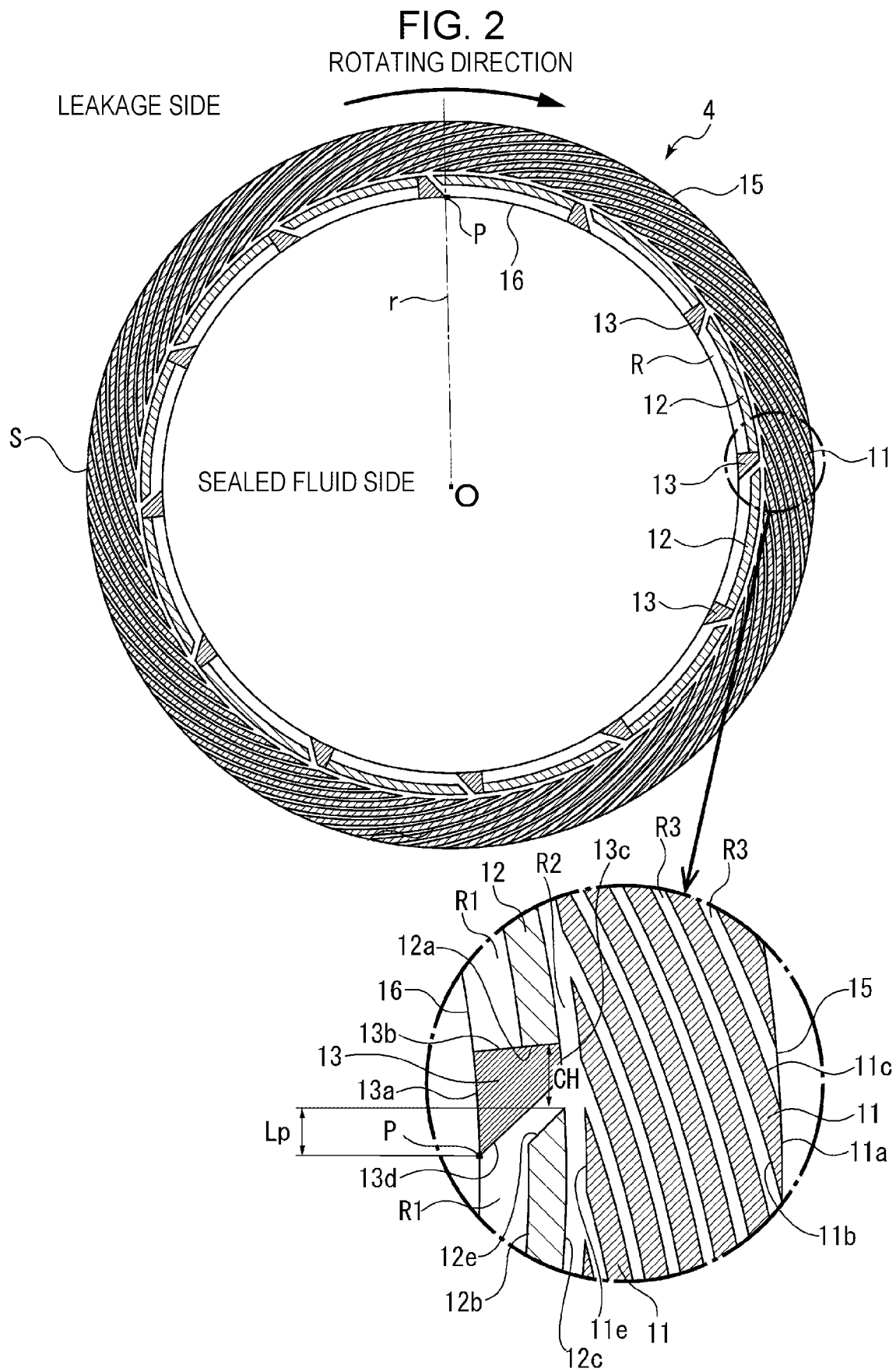
FIG. 2 is a drawing showing a sliding face of a rotating-side sealing ring of the first embodiment taken along the arrow W-W in FIG. 1.

With reference to FIG. 1 and FIG. 2, a slide component according to a first embodiment of the present invention will be described.

In the first embodiment, a mechanical seal which is an example of the slide component will be described. In the first embodiment, although the inner peripheral side of slide components constituting the mechanical seal is described as a sealed fluid side (liquid side or mist-like fluid side) and the outer peripheral side is described as a leakage side (gas side), the present invention is not limited thereto, and is also applicable to a case where the inner peripheral side is the leakage side (gas side) and the outer peripheral side is the sealed fluid side (liquid side or mist-like fluid side). Moreover, with respect to the magnitude relation between the pressures on the sealed fluid side (liquid side or mist-like fluid side) and the leakage side (gas side), for example, the pressure on the sealed fluid side (liquid side or mist-like fluid side) may be high and the pressure on the leakage side (gas side) may be low, or vice versa, and both pressures may be the same.

A mechanical seal 1 in FIG. 1 includes a rotating-side sealing ring 4 integrally rotatable with a sleeve 3 mounted on a rotating shaft 2 side, a circular-ring shaped stationary-side sealing ring 7 which is the other slide component provided in a state of being axially movable, and a coiled wave spring 8 axially biasing the stationary-side sealing ring 7, and mirror-finished sliding faces S slide in close contact with each other.

That is, in the mechanical seal 1, the rotating-side sealing ring 4 and the stationary-side sealing ring 7 have the sliding faces S formed radially, and the mechanical seal 1 prevents a sealed fluid, for example, a liquid or a mist-like fluid (hereinafter, it may be referred to as simply "a liquid"), from flowing out from the inner periphery of the sliding face S to the leakage side on the outer peripheral side at each other's sliding faces S. In addition, reference numeral 9 indicates an O-ring for sealing between a cartridge 6 and the stationary-side sealing ring 7. Moreover, in this embodiment, a case where the sleeve 3 and the rotating-side sealing ring 4 are separately formed is described, but the present invention is not limited thereto, and the sleeve 3 and the rotating-side sealing ring 4 may be integrally formed.

Although the materials of the rotating-side sealing ring 4 and the stationary-side sealing ring 7 are selected from silicon carbide (SiC) excellent in wear resistance, carbon excellent in self-lubricity and the like, for example, both may be SiC or combinations of SiC as one and carbon as the other are possible.

FIG. 2 is a drawing showing the sliding face S of the rotating-side sealing ring 4 of the slide component according to the first embodiment of the present invention. The outer peripheral side of the sliding face S of the rotating-side sealing ring 4 is the leakage side, for example, the gas side, the inner peripheral side is the sealed fluid side, for example, the liquid side, and the rotating-side sealing ring 4 rotates in a clockwise direction as shown by the arrow.

In FIG. 2, the sliding face S of the rotating-side sealing ring 4 includes a fluid introduction groove 13, a positive pressure generation groove 12 (a first pressure generation mechanism according to the present invention), and a spiral groove 11 (a second pressure generation mechanism according to the present invention). The positive pressure generation groove 12 and the fluid introduction groove 13 are arranged nearer a sealed fluid-side periphery 16 than an annular land portion R2, and the spiral groove 11 is arranged nearer a leakage-side periphery 15 than the annular land portion R2. In addition, a plural number of (twelve in the embodiment of FIG. 2) fluid introduction grooves 13 and positive pressure generation grooves 12 are provided circumferentially at equal intervals so as to surround the sealed fluid-side periphery 16. In addition, in the present description, a plural number is not limited to twelve in the embodiment, and one or more grooves may be possible as long as they can surround the sealed fluid-side periphery 16. Moreover, they are provided not only at equal intervals. The number and shape of the spiral grooves 11 also can be changed depending on the conditions.

In FIG. 2, the fluid introduction groove 13 is a groove which is formed into a trapezoidal shape when viewed in an axial direction, and in which only an opening 13a is opened to the sealed fluid side, and other portions are surrounded and closed by the land portions. Specifically, the fluid introduction groove 13 has the opening 13a opened to the sealed fluid-side periphery 16, a wall part 13c surrounded by the annular land portion R2 at a position facing the opening 13a, an opening-side wall part 13b adjacent to the opening 13a and in communication with an opening 12a described later of the positive pressure generation groove 12, and an inclined wall part 13d facing a toe part 12e (a Rayleigh step 12e) described later of the positive pressure generation groove 12 across a land portion R1. With respect to a radial axis r connecting an intersection point P of the inclined wall part 13d and the sealed fluid-side periphery 16 and a center O of the rotating-side sealing ring 4, the inclined wall part 13d is inclined to a direction to approach the opening-side wall part 13b (the opening 12a of the positive pressure generation groove 12). That is, the inclined wall part 13d is inclined to a direction in which the area of the fluid introduction groove 13 viewed in the axial direction is reduced. In addition, the depth of the fluid introduction groove 13 is set sufficiently deeper than the positive pressure generation groove 12 and the spiral groove 11, and, for example, is set to around 10 μm-500 μm.

The positive pressure generation groove 12 (the first pressure generation mechanism according to the present invention) is an arcuate groove having a predetermined length. The positive pressure generation groove 12 has the opening 12a (one end of the first pressure generation mechanism in the present invention) at one end of a longitudinal direction, the toe part 12e (the other end of the first pressure generation mechanism in the present invention) at the other end of the longitudinal direction, and a pair of wall parts 12b, 12c in a lateral direction. The opening 12a is in communication with the fluid introduction groove 13, the toe part 12e and the wall part 12b are surrounded by the land portion R1, and the wall part 12c is surrounded by the annular land portion R2. In addition, the depth of the positive pressure generation groove 12 is set to around 0.1 μm to 10 μm.

The spiral groove 11 (the second pressure generation mechanism according to the present invention) has an opening 11a (one end of the second pressure generation mechanism in the present invention) in the leakage-side periphery 15, a closed end part 11e (the other end of the second pressure generation mechanism according to the present invention) surrounded by the annular land portion R2 at the other end part of the longitudinal direction, and a pair of wall parts 11b, 11c surrounded by a land portion R3 in the lateral direction. A predetermined number (sixty in the example of FIG. 2) of the spiral grooves 11 and the land portions R3 are alternately arranged circumferentially at equal intervals. Thereby, the respective spiral grooves 11 are separated by the land portions R3. Moreover, the closed end part 11e side of the spiral groove 11 is surrounded by the circumferentially continuous circular-ring shaped land portions R2. Thereby, the spiral groove 11 is separated by the annular land portion R2 from the fluid introduction groove 13 and the positive pressure generation groove 12. Here, the annular land portions R2 are the circumferentially continuous circular-ring shaped land portions partitioned by circles formed by the circumferentially continued closed end parts 11e of the spiral groove 11 and circles formed by the circumferentially continued wall parts 12c of the positive pressure generation groove 12 facing the closed end parts 11e of the spiral groove 11. In addition, the number of the spiral grooves 11 and the land portions R3 is not limited to sixty, and may be more than sixty, or less than sixty.

The operation and effects of the thus configured slide component according to the first embodiment will be described.

The fluid introduction groove 13 takes in the fluid from the sealed fluid side into the fluid introduction groove 13 through the opening 13a in communication with the sealed fluid-side periphery 16, and even when a fluid lubrication state is not sufficient in a low-speed rotation state such as at the starting time, it is possible to supply the fluid to the sliding face S and to contribute to lubrication of the sliding face S. Moreover, by forming the fluid introduction groove 13 into a trapezoidal shape, it is possible to increase the opening 13a of the fluid introduction groove 13, and therefore it is possible to sufficiently take in the fluid into the fluid introduction groove 13.

As shown in FIG. 2, when the rotating-side sealing ring 4 is rotated in a clockwise direction, the fluid introduced in the fluid introduction groove 13 is drawn, due to viscosity of the fluid, into the positive pressure generation groove 12 in communication with the fluid introduction groove 13. The fluid drawn into the positive pressure generation groove 12 is dammed in the vicinity of the toe part 12e and generates dynamic pressure (positive pressure). By the positive pressure, a fluid film between the sliding faces is increased, and lubrication property is improved. The positive pressure groove 12 generates positive pressure (dynamic pressure) even in a low-speed rotation state of the rotating-side sealing ring 4 such as at the starting time, and therefore a liquid film at low speed on the sliding face is increased, and it is possible to improve lubrication property at low speed. In addition, since the toe part 12e of the positive pressure generation groove 12 is formed to be tapered in the longitudinal direction of the positive pressure generation groove 12, the fluid drawn into the positive pressure generation groove 12 is extracted, and therefore a pressure rising action in the vicinity of the toe part 12e can be further increased.

As shown in FIG. 2, when the rotating-side sealing ring 4 is rotated in a clockwise direction, the spiral groove 11 sucks the fluid through the opening 11a in communication with the leakage-side periphery 15, and generates dynamic pressure (positive pressure) in the vicinity of the closed end part 11e. By the dynamic pressure, the gap between the sliding faces S of the rotating-side sealing ring 4 and the stationary-side sealing ring 7 is increased, and the sliding faces S are brought into a fluid lubrication state to have very low friction. At the same time, the fluid is pumped by the spiral groove 11 toward the sealed fluid side from the leakage side, and therefore the fluid on the sealed fluid side is prevented from leaking to the leakage side, and sealing performance is improved. Moreover, the spiral groove 11 and the positive pressure generation groove 12 are separated by the annular land portion R2, and therefore it is possible to prevent interference of the spiral groove 11 and the positive pressure generation groove 12, and leakage does not occur even at a standstill.

Using the inclined wall part 13d of the trapezoidal shaped fluid introduction groove 13, the inclined wall part 13d and the toe part 12e of the end part of the positive pressure generation groove 12 can easily form an overlapping portion Lp. Moreover, by providing the overlapping portion Lp, it is possible to narrow a circumferential width CH of a gap (hereinafter, referred to as "a leakage area") between the opening 12a of the positive pressure generation groove 12 and the toe part 12e facing the opening 12a across the land portion R1. That is, it is possible to narrow the circumferential width CH of the leakage area such that the fluid introduction groove 13 and the toe part 12e of the positive pressure generation groove 12 which are adjacent to each other do not overlap.

In a case where the rotating-side sealing ring 4 is rotated in a counterclockwise direction reverse to the arrow in FIG. 2, in the spiral groove 11, a pumping action in which the fluid on the leakage side is pumped up to the sealed fluid side is deteriorated. On the other hand, in the case of reverse rotation, negative pressure is reversely generated in the positive pressure generation groove 12. Thereby, the fluid discharged from the spiral groove 11 is sucked in the positive pressure generation groove 12 having negative pressure, and therefore it is possible to compensate deterioration in pumping action of the spiral groove 11 at the reverse rotation. However, in the leakage area, a suction effect by the negative pressure of the positive pressure generation groove 12 is not influenced, and therefore the fluid leaks to the leakage side through the leakage area from the sealed fluid side. Then, by providing the overlapping portion Lp, it is possible to narrow the circumferential width CH of the leakage area, and therefore even if the spiral groove 11 cannot generate enough dynamic pressure as in the case of reverse rotation, it is possible to reduce the fluid flowing through the leakage area and to keep sealing performance.

Second Embodiment

Figure 3:
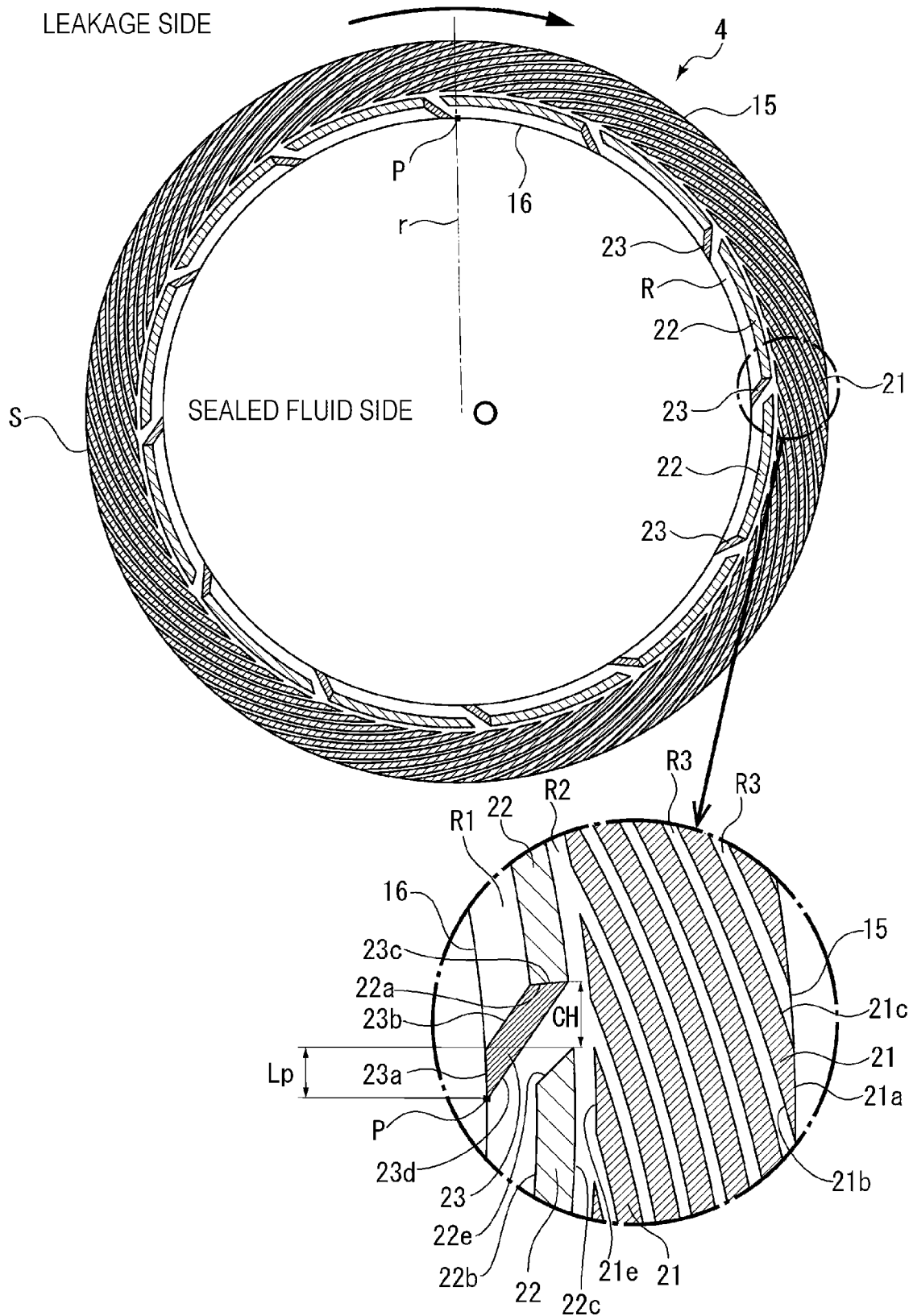
FIG. 3 is a drawing showing the sliding face of the rotating-side sealing ring of a second embodiment taken along the arrow W-W in FIG. 1.

The slide component according to a second embodiment of the present invention will be described. FIG. 3 shows the sliding face S of the rotating-side sealing ring 4 of the slide component according to the second embodiment, and in the second embodiment, the shape of a fluid introduction groove 23 is only different from the first embodiment, and other configurations are the same as those in the first embodiment. Hereinafter, the same members as those in the first embodiment are denoted by the same numerals and symbols, and redundant descriptions will be omitted.

In FIG. 3, the sliding face S of the rotating-side sealing ring 4 includes the fluid introduction groove 23, a positive pressure generation groove 22 (the first pressure generation mechanism according to the present invention), and a spiral groove 21 (the second pressure generation mechanism according to the present invention). The positive pressure generation groove 22 and the fluid introduction groove 23 are arranged nearer the sealed fluid-side periphery 16 than the annular land portion R2, and the spiral groove 21 is arranged nearer the leakage-side periphery 15 than the annular land portion R2. In addition, a plural number of (twelve in the embodiment of FIG. 3) fluid introduction grooves 23 and positive pressure generation grooves 22 are provided circumferentially at equal intervals so as to surround the sealed fluid-side periphery 16.

In FIG. 3, the fluid introduction groove 23 has a width nearly equal to that of the positive pressure generation groove 22, and is formed into a trapezoidal shape when viewed in the axial direction, and only an opening 23a is opened to the sealed fluid-side periphery 16. Specifically, the fluid introduction groove 23 has the opening 23a opened to the sealed fluid-side periphery 16, an opening-side wall part 23c in communication with an opening 22a described later of the positive pressure generation groove 22 at a position facing the opening 23a, an inclined wall part 23b facing the sealed fluid-side periphery 16 across the land portion R1, and an inclined wall part 23d facing a toe part 22e of the positive pressure generation groove 22. With respect to the radial axis r connecting the intersection point P of the inclined wall part 23d and the sealed fluid-side periphery 16 and the center O of the rotating-side sealing ring 4, the inclined wall part 23d is inclined to a direction to approach the opening-side wall part 23c (the opening 22a of the positive pressure generation groove 22). That is, the inclined wall part 23d is inclined to a direction in which the area of the fluid introduction groove 23 viewed in the axial direction is reduced.

The positive pressure generation groove 22 (the first pressure generation mechanism according to the present invention) is an arcuate groove having a predetermined length. The positive pressure generation groove 22 has the opening 22a (one end of the first pressure generation mechanism in the present invention) at one end of the longitudinal direction, the toe part 22e (the other end of the first pressure generation mechanism in the present invention) at the other end of the longitudinal direction, and a pair of wall parts 22b, 22c in the lateral direction. The opening 22a is in communication with the fluid introduction groove 23, the toe part 22e and the wall part 22b are surrounded by the land portion R1, and the wall part 22c is surrounded by the annular land portion R2. In addition, the depth of the positive pressure generation groove 22 is set to around 0.1 µm to 10 µm.

The spiral groove 21 (the second pressure generation mechanism according to the present invention) has an opening 21a (one end of the second pressure generation mechanism in the present invention) in the leakage-side periphery 15, a closed end part 21e (the other end of the second pressure generation mechanism according to the present invention) surrounded by the annular land portion R2 at the other end part of the longitudinal direction, and a pair of wall parts 21b, 21c surrounded by the land portion R3 in the lateral direction. A predetermined number (sixty in the example of FIG. 2) of the spiral grooves 21 and the land portions R3 are alternately arranged circumferentially at equal intervals. Thereby, the respective spiral grooves 21 are separated by the land portions R3. Moreover, the closed end part 21e side of the spiral groove 21 is surrounded by the circumferentially continuous circular-ring shaped land portions R2. Thereby, the spiral groove 21 is separated by the annular land portion R2 from the fluid introduction groove 23 and the positive pressure generation groove 22. Here, the annular land portions R2 are the circumferentially continuous circular-ring shaped land portions partitioned by circles formed by the circumferentially continued closed end parts 21e of the spiral groove 21 and circles formed by the circumferentially continued wall parts 22c of the positive pressure generation groove 22 facing the closed end parts 21e of the spiral groove 21.

The operation and effects of the thus configured slide component according to the second embodiment will be described. In addition, the configuration of the spiral groove 21 is same as the configuration of the spiral groove 11 of the first embodiment, and therefore redundant descriptions will be omitted.

The fluid introduction groove 23 is arranged at an angle with respect to the sealed fluid-side periphery 16, and therefore can take in, at low resistance, the rotating fluid on the sealed fluid side into the fluid introduction groove 23 through the opening 23a. Thereby, even when a fluid lubrication state is not sufficient in a low-speed rotation state such as at the starting time, it is possible to supply the fluid to the sliding face S and to contribute to lubrication of the sliding face S.

As shown in FIG. 3, when the rotating-side sealing ring 4 is rotated in a clockwise direction, the sealed fluid flows into the positive pressure generation groove 22 through the fluid introduction groove 23 from the opening 23a. The fluid flowed into the positive pressure generation groove 22 is dammed at the toe part 22e and generates high positive pressure, and by the positive pressure, it is possible to increase a fluid film between the sliding faces and to improve lubrication property. The spiral groove 21 sucks the fluid through the opening 21a in communication with the leakage-side periphery 15, and generates dynamic pressure (positive pressure) in the vicinity of the closed end part 21e on the inner peripheral side. By the dynamic pressure, the gap between the sliding faces S of the rotating-side sealing ring 4 and the stationary-side sealing ring 7 is increased, and the sliding faces S are brought into a fluid lubrication state to have very low friction. At the same time, the fluid is pumped by the spiral groove 21 toward the sealed fluid side from the leakage side, and therefore the fluid on the sealed fluid side is prevented from leaking to the leakage side, and sealing performance is improved.

Moreover, the fluid introduction groove 23 and the toe part 22e of the positive pressure generation groove 22 facing the fluid introduction groove 23 across the land portion R1 constitute the overlapping portion Lp where they circumferentially overlap. By providing the overlapping portion Lp, it is possible to narrow the circumferential width CH of a gap (hereinafter, referred to as "a leakage area") between the opening 22a of the positive pressure generation groove 22 and the toe part 22e facing the opening 22a across the fluid introduction groove 23. That is, it is possible to narrow the circumferential width CH of the leakage area such that the fluid introduction groove 23 and the toe part 22e of the positive pressure generation groove 22 do not overlap. Thereby, even if the spiral groove 21 cannot exhibit sufficient pumping action as at the reverse rotation, it is possible to reduce leakage flow flowing through the leakage area. Further, a pumping effect due to the negative pressure in the positive pressure generation groove 22 can compensate for reduction in pumping effect of the spiral groove 21, and therefore it is possible to improve sealing performance even in a case of reverse rotation.

Third Embodiment

Figure 4:
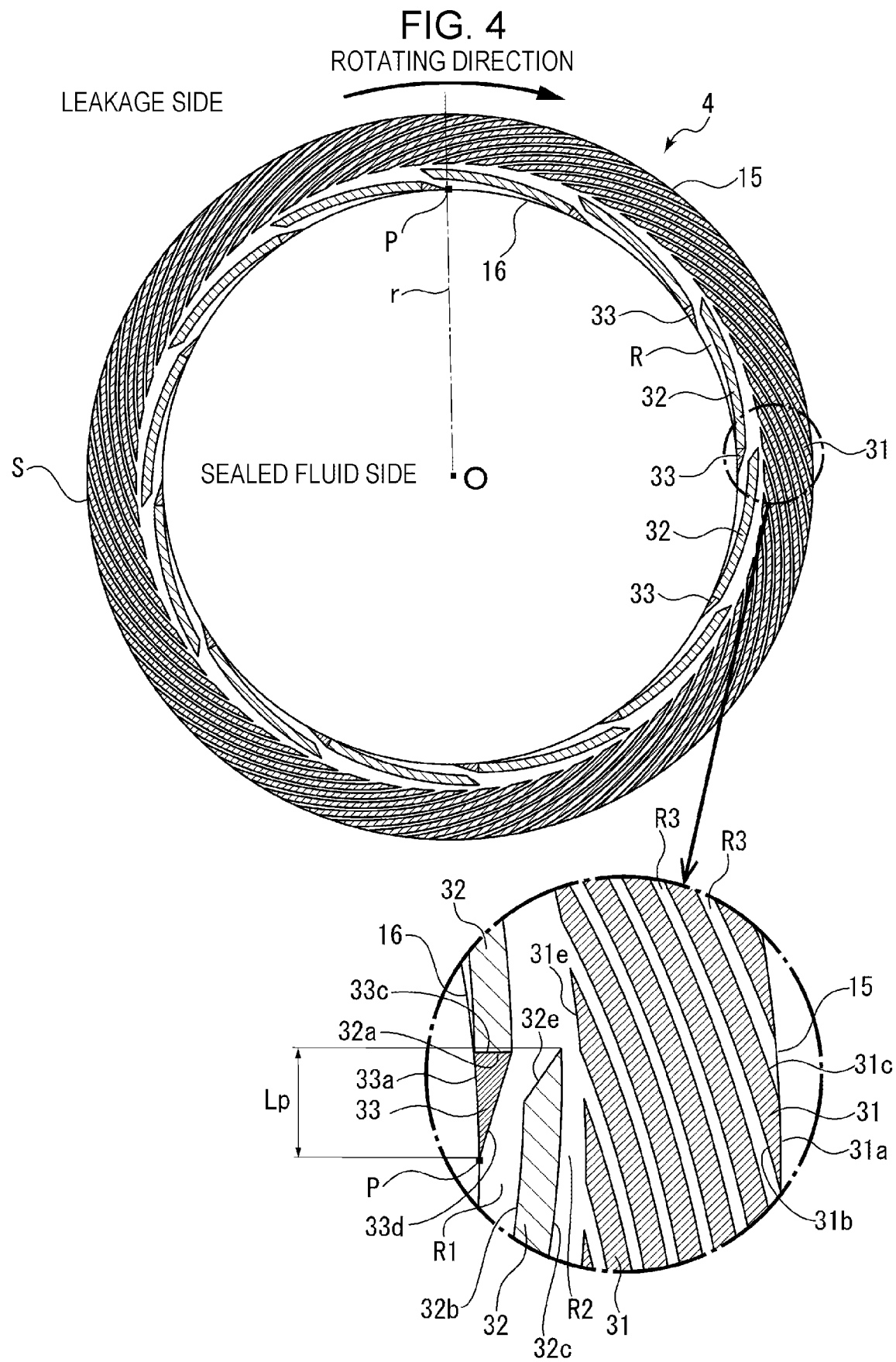
FIG. 4 is a drawing showing the sliding face of the rotating-side sealing ring of a third embodiment taken along the arrow W-W in FIG. 1.

The slide component according to a third embodiment of the present invention will be described. FIG. 4 shows the sliding face S of the rotating-side sealing ring 4 of the slide component according to the third embodiment, and in the third embodiment, the shapes of a fluid introduction groove 33 and a positive pressure generation groove 32 are only different from the first and the second embodiments, and other configurations are the same as those in the first and the second embodiments. Hereinafter, the same members as those in the first and the second embodiments are denoted by the same numerals and symbols, and redundant descriptions will be omitted.

In FIG. 4, the sliding face S of the rotating-side sealing ring 4 includes the fluid introduction groove 33, the positive pressure generation groove 32 (the first pressure generation mechanism according to the present invention), and a spiral groove 31 (the second pressure generation mechanism according to the present invention). The positive pressure generation groove 32 and the fluid introduction groove 33 are arranged nearer the sealed fluid-side periphery 16 than the annular land portion R2, and the spiral groove 31 is arranged nearer the leakage-side periphery 15 than the annular land portion R2. In addition, a plural number of (twelve in the embodiment of FIG. 3) fluid introduction grooves 33 and positive pressure generation grooves 32 are provided circumferentially at equal intervals so as to surround the sealed fluid-side periphery 16.

In FIG. 4, the fluid introduction groove 33 is formed into a triangular shape when viewed in the axial direction, and only an opening 33a is opened to the sealed fluid-side periphery 16. The fluid introduction groove 33 has the opening 33a opened to the sealed fluid-side periphery 16, an opening-side wall part 33c in communication with an opening 32a of the positive pressure generation groove 32, and an inclined wall part 33d facing a toe part 32e of the positive pressure generation groove 32 across the land portion R1. With respect to the radial axis r connecting the intersection point P of the inclined wall part 33d and the sealed fluid-side periphery 16 and the center O of the rotating-side sealing ring 4, the inclined wall part 33d is inclined to a direction to approach the opening-side wall part 33c (the opening 32a of the positive pressure generation groove 32). That is, the inclined wall part 33d is inclined to a direction in which the area of the fluid introduction groove 33 viewed in the axial direction is reduced around the intersection point P.

The positive pressure generation groove 32 (the first pressure generation mechanism according to the present invention) is an arcuate groove having a predetermined length. The positive pressure generation groove 32 has the opening 32a (one end of the first pressure generation mechanism in the present invention) at one end of the longitudinal direction, the toe part 32e (the other end of the first pressure generation mechanism in the present invention) at the other end of the longitudinal direction, and a pair of wall parts 32b, 32c in the lateral direction. The opening 32a is in communication with the fluid introduction groove 33, the toe part 32e and the wall part 32b are surrounded by the land portion R1, and the wall part 32c is surrounded by the annular land portion R2. In addition, the depth of the positive pressure generation groove 32 is set to around 0.1 μm to 10 μm.

The spiral groove 31 (the second pressure generation mechanism according to the present invention) has an opening 31a (one end of the second pressure generation mechanism in the present invention) in the leakage-side periphery 15, a closed end part 31e (the other end of the second pressure generation mechanism according to the present invention) surrounded by the annular land portion R2 at the other end part of the longitudinal direction, and a pair of wall parts 31b, 31c surrounded by the land portion R3 in the lateral direction. A predetermined number (sixty in the example of FIG. 2) of the spiral grooves 31 and the land portions R3 are alternately arranged circumferentially at equal intervals. Thereby, the respective spiral grooves 31 are separated by the land portions R3. Moreover, the closed end part 31e side of the spiral groove 31 is surrounded by the circumferentially continuous circular-ring shaped land portions R2. Thereby, the spiral groove 31 is separated by the annular land portion R2 from the fluid introduction groove 33 and the positive pressure generation groove 32. Here, the annular land portions R2 are the circumferentially continuous annular land portions partitioned by circles formed by the circumferentially continued closed end parts 31e of the spiral groove 31 and annular portions formed by the circumferentially continued wall parts 32c of the positive pressure generation groove 32 facing the closed end parts 31e of the spiral groove 31. In addition, the number of the spiral grooves 31 and the land portions R3 is not limited to sixty, and may be more than sixty, or less than sixty.

The operation and effects of the thus configured slide component according to the third embodiment will be described. The spiral groove 31 has the same configuration as the spiral groove 11 of the first embodiment, and therefore a description thereof will be omitted.

The positive pressure generation groove 32 is arranged in a state that an upstream side thereof in communication with the fluid introduction groove 33 is near the sealed fluid-side periphery 16 side and the toe part 32e on a downstream side is near the spiral groove 31 side. Thereby, the positive pressure generation groove 32 is arranged to be inclined to the leakage side from the sealed fluid side toward the toe part 32e from the fluid introduction groove 33 side, and therefore it is possible to efficiently take in the fluid with low loss into the positive pressure generation groove 32 from the fluid introduction groove 33 during rotation, the toe part 32e generates high positive pressure, and by the positive pressure, it is possible to increase a fluid film between the sliding faces and to improve lubrication property.

Moreover, the triangular fluid introduction groove 33 can be reduced in its radial width, and therefore it is possible to increase the overlapping portion Lp of the fluid introduction groove 33 and the positive pressure generation groove 32 even in a narrow space. In the embodiment of FIG. 4, the overlapping portion Lp is increased and the circumferential width CH of the leakage area is made to zero, and the fluid introduction groove 33 can be annularly surrounded by the positive pressure generation groove 32.

Moreover, the fluid introduction groove 33 and the toe part 32e of the positive pressure generation groove 32 facing the fluid introduction groove 33 across the land portion R1 constitute the overlapping portion Lp where they circumferentially overlap. By providing the overlapping portion Lp, the opening 32a of the positive pressure generation groove 32 and the toe part 32e facing the opening 32a across the land portion R1 completely overlap. Thereby, the circumferential width CH of the leakage area is made to zero, and the sealed fluid side of the spiral groove 31 can be annularly surrounded by the positive pressure generation groove 32. Thereby, even if the spiral groove 31 cannot exhibit sufficient pumping action as at the reverse rotation, it is possible to reduce leakage of the fluid to the leakage side from the sealed fluid side, and further, a pumping effect due to the negative pressure in the positive pressure generation groove 32 can compensate for reduction in pumping effect of the spiral groove 31, and therefore it is possible to improve sealing performance even in a case of reverse rotation.

Fourth Embodiment

Figure 5:
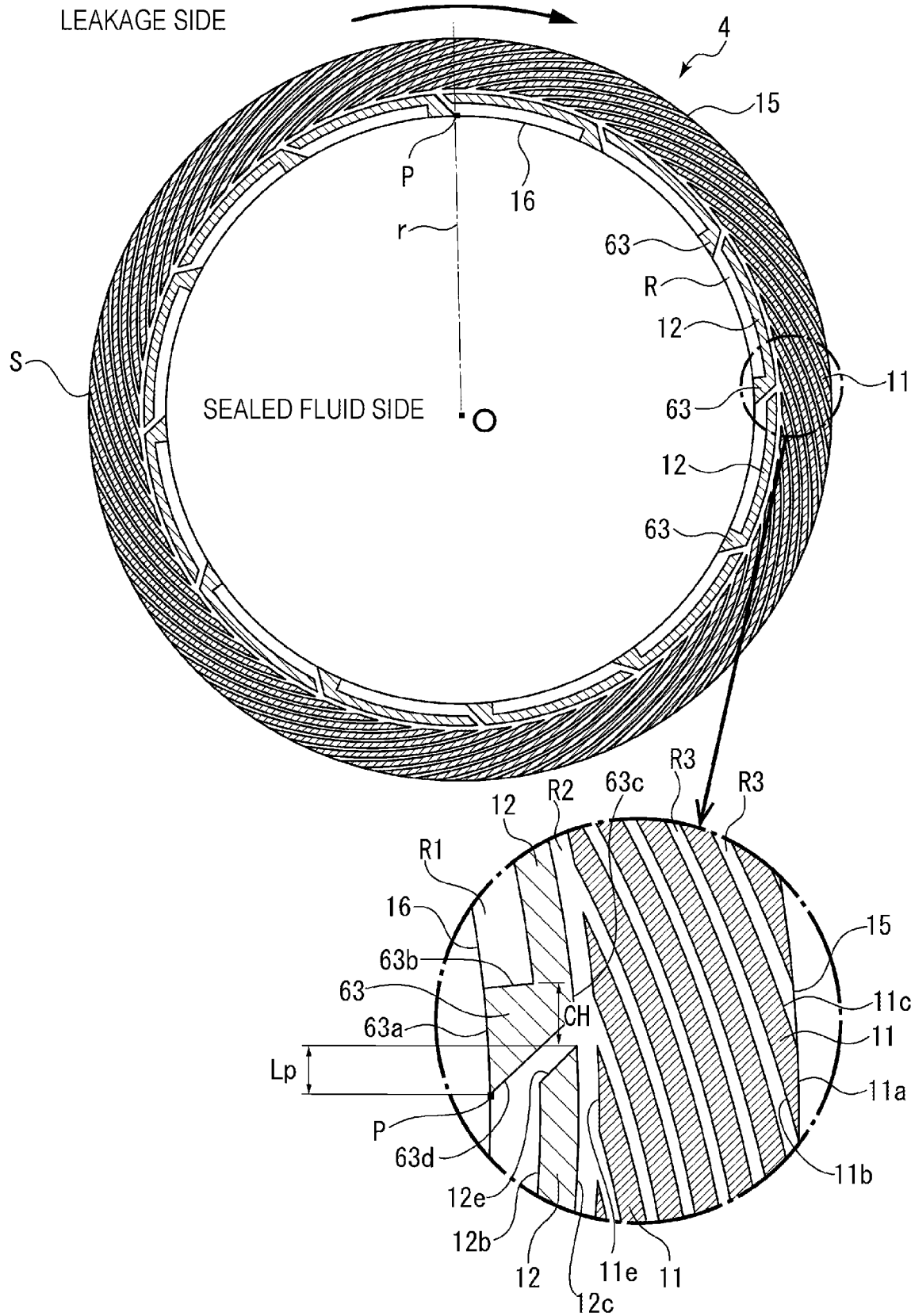
FIG. 5 is a drawing showing the sliding face of the rotating-side sealing ring of a fourth embodiment taken along the arrow W-W in FIG. 1.

The slide component according to a fourth embodiment of the present invention will be described. FIG. 5 shows the sliding face S of the rotating-side sealing ring 4 of the slide component according to the fourth embodiment, and in the fourth embodiment, the depth of a fluid introduction groove 63 is only different from the first embodiment, and other configurations are the same as those in the first embodiment. Hereinafter, the same members as those in the first embodiment are denoted by the same numerals and symbols, and redundant descriptions will be omitted.

The sliding face S includes the fluid introduction groove 63, the positive pressure generation groove 12 (the first pressure generation mechanism according to the present invention), and the spiral groove 11 (the second pressure generation mechanism according to the present invention). The positive pressure generation groove 12 and the fluid introduction groove 63 are arranged nearer the sealed fluid-side periphery 16 than the annular land portion R2, and the spiral groove 11 is arranged nearer the leakage-side periphery 15 than the annular land portion R2. In addition, the positive pressure generation groove 12 and the spiral groove 11 have the same configurations as the positive pressure generation groove 12 and the spiral groove 11 of the first embodiment, and therefore descriptions thereof will be omitted.

In FIG. 5, the fluid introduction groove 63 is formed into a trapezoidal shape when viewed in an axial direction, and only an opening 63a is opened to the sealed fluid side. Specifically, the fluid introduction groove 63 has the opening 63a opened to the sealed fluid-side periphery 16, a wall part 63c surrounded by the annular land portion R2 at a position facing the opening 63a, an opening-side wall part 63b facing the sealed fluid-side periphery 16 across the land portion R1 and in communication with the opening 12a of the positive pressure generation groove 12, and an inclined wall part 63d facing the toe part 12e (the Rayleigh step 12e) of the positive pressure generation groove 12 across the land portion R1. With respect to the radial axis r connecting the intersection point P of the inclined wall part 63d and the sealed fluid-side periphery 16 and the center O of the rotating-side sealing ring 4, the inclined wall part 63d is inclined to a direction to approach the opening-side wall part 63b (the opening 12a of the positive pressure generation groove 12). That is, the inclined wall part 63d is inclined to a direction in which the area of the fluid introduction groove 63 viewed in the axial direction is reduced. In addition, the depth of the fluid introduction groove 63 is set to the depth almost same as the positive pressure generation groove 12 and the spiral groove 11, and, for example, is set to around 0.1 to 10 μm.

The operation and effects of the thus configured slide component according to the fourth embodiment will be described. In addition, the operation and effects of the positive pressure generation groove 12 and the spiral groove 11 are same as the first embodiment, and therefore redundant descriptions will be omitted.

By forming the fluid introduction groove 63 into a trapezoidal shape, it is possible to increase the opening 63a, and therefore it is possible to easily take in the fluid into the fluid introduction groove 63. Thereby, even when a fluid lubrication state is not sufficient in a low-speed rotation state such as at the starting time, it is possible to supply the fluid to the sliding face S and to contribute to lubrication of the sliding face S. Moreover, using the inclined wall part 63d of the trapezoidal shaped fluid introduction groove 63, the end part on the toe part 12e side of the positive pressure generation groove 12 and the inclined wall part 63d of the fluid introduction groove 63 can form the overlapping portion Lp where they circumferentially overlap.

By providing the overlapping portion Lp, it is possible to narrow the circumferential width CH of the leakage area such that the fluid introduction groove 63 and the toe part 12e of the positive pressure generation groove 12 do not overlap. Further, since the depth of the fluid introduction groove 63 is shallower than the fluid introduction groove 13 of the first embodiment, it is possible to further reduce the cross-sectional area of the leakage area, and therefore it is possible to further narrow the leakage area.

In a case where the rotating-side sealing ring 4 is rotated in a counterclockwise direction reverse to the arrow in FIG. 5, in the spiral groove 11, a pumping action in which the fluid on the leakage side is pumped up to the sealed fluid side is deteriorated. However, even if the pumping action of the spiral groove 11 is deteriorated, it is possible to narrow the size of the circumferential width CH of the leakage area by providing the overlapping portion Lp. Besides, it is possible to further narrow the cross-sectional area of the leakage area by shallowing the depth of the fluid introduction groove 63 and further reducing the cross-sectional area of the leakage area, and therefore the flow to the leakage side through the leakage area from the sealed fluid side can be restricted, and sealing performance can be further improved.

Fifth Embodiment

Figure 6:
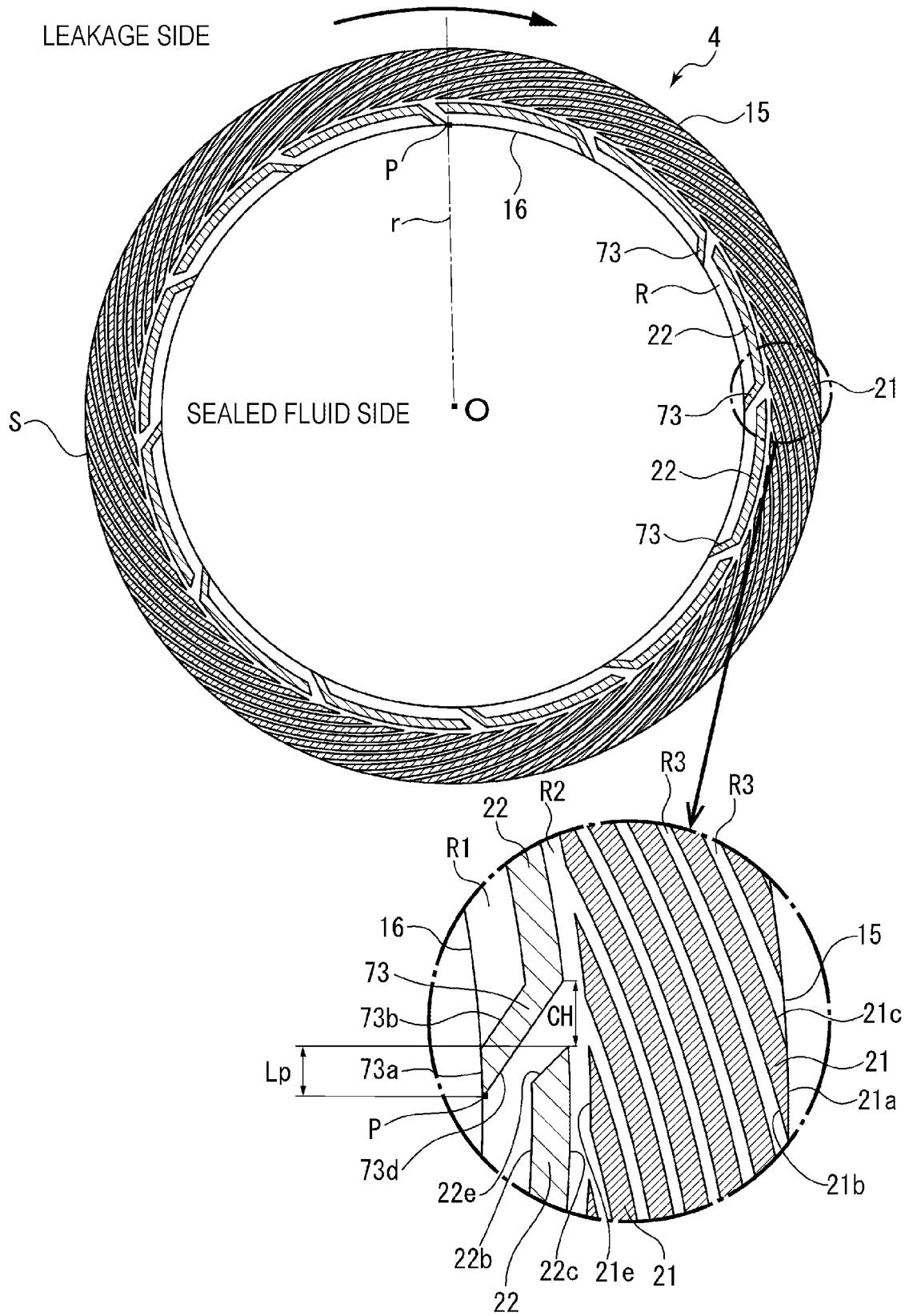
FIG. 6 is a drawing showing the sliding face of the rotating-side sealing ring of a fifth embodiment taken along the arrow W-W in FIG. 1.

The slide component according to a fifth embodiment of the present invention will be described. FIG. 6 shows the sliding face S of the rotating-side sealing ring 4 of the slide component according to the fifth embodiment, and in the fifth embodiment, the depth of a fluid introduction groove 73 is only different from the second embodiment, and other configurations are the same as those in the second embodiment. Hereinafter, the same members as those in the second embodiment are denoted by the same numerals and symbols, and redundant descriptions will be omitted.

In FIG. 6, the sliding face S of the rotating-side sealing ring 4 includes the fluid introduction groove 73, the positive pressure generation groove 22 (the first pressure generation mechanism according to the present invention), and the spiral groove 21 (the second pressure generation mechanism according to the present invention). The positive pressure generation groove 22 and the fluid introduction groove 73 are arranged nearer the sealed fluid-side periphery 16 than the annular land portion R2, and the spiral groove 21 is arranged nearer the leakage-side periphery 15 than the annular land portion R2. In addition, the positive pressure generation groove 22 and the spiral groove 21 have the same configurations as the positive pressure generation groove 22 and the spiral groove 21 of the second embodiment, and therefore descriptions thereof will be omitted.

In FIG. 6, the fluid introduction groove 73 has a width nearly equal to that of the positive pressure generation groove 22, and is formed into a trapezoidal shape when viewed in the axial direction, and only an opening 73a is opened to the sealed fluid-side periphery 16. Specifically, the fluid introduction groove 73 has the opening 73a opened to the sealed fluid-side periphery 16 (at a position facing the opening 73a, the opening 22a of the positive generation groove 22 is arranged), an inclined wall part 73b facing the sealed fluid-side periphery 16 across the land portion R1, and an inclined wall part 73d facing the toe part 22e of the positive pressure generation groove 22 across the land portion R1. With respect to the radial axis r connecting the intersection point P of the inclined wall part 73d and the sealed fluid-side periphery 16 and the center O of the rotating-side sealing ring 4, the inclined wall part 73d is inclined to a direction to approach the opening 22a of the positive pressure generation groove 22. That is, the inclined wall part 73d is inclined to a direction in which the area of the fluid introduction groove 73 viewed in the axial direction is reduced. In addition, the depth of the fluid introduction groove 73 is set to the depth almost same as the positive pressure generation groove 22 and the spiral groove 21, and, for example, is set to around 0.1 to 10 μm.

The operation and effects of the thus configured slide component according to the fifth embodiment will be described. In addition, the operation and effects of the positive pressure generation groove 22 and the spiral groove 21 are same as the second embodiment, and therefore redundant descriptions will be omitted.

The fluid introduction groove 73 can easily take in the fluid, and therefore even when a fluid lubrication state is not sufficient in a low-speed rotation state such as at the starting time, it is possible to supply the fluid to the sliding face S and to contribute to lubrication of the sliding face S.

Moreover, using the inclined wall part 73d of the trapezoidal shaped fluid introduction groove 73, the end part on the toe part 22e side of the positive pressure generation groove 22 and the inclined wall part 73d can form the overlapping portion Lp where they circumferentially overlap. Thereby, it is possible to narrow the circumferential width CH of the leakage area such that the fluid introduction groove 73 and the toe part 22e of the positive pressure generation groove 22 do not overlap. Further, the depth of the fluid introduction groove 73 is shallower than the fluid introduction groove 23 of the second embodiment, and therefore it is possible to further reduce the cross-sectional area of the leakage area. Thereby, even when the pumping action of the spiral groove 21 is deteriorated as at the reverse rotation, it is possible to restrict the fluid from flowing out to the leakage side through the leakage area from the sealed fluid side and thus it is possible to improve sealing performance.

Sixth Embodiment

Figure 7:
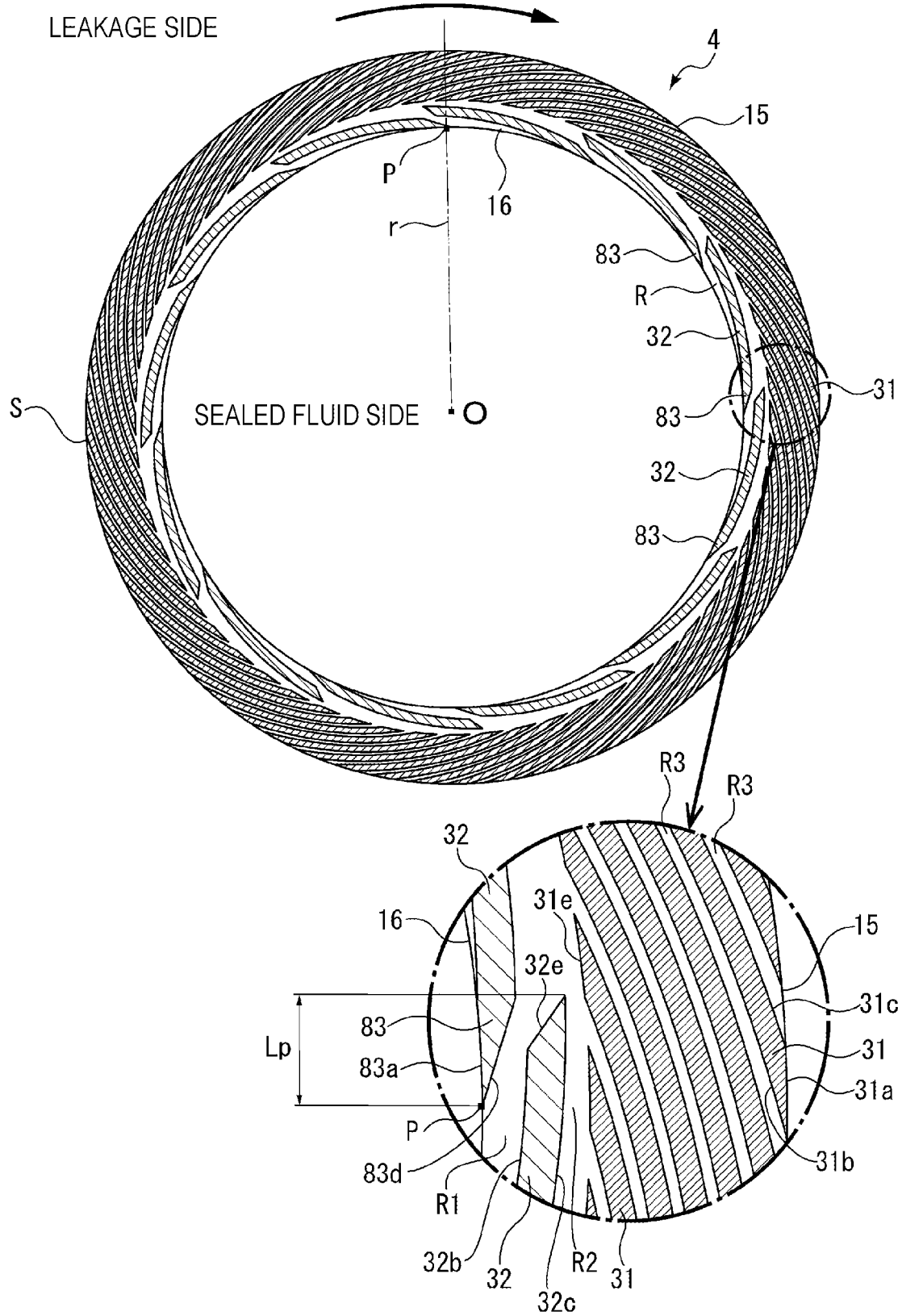
FIG. 7 is a drawing showing the sliding face of the rotating-side sealing ring of a sixth embodiment taken along the arrow W-W in FIG. 1.

The slide component according to a sixth embodiment of the present invention will be described. FIG. 7 shows the sliding face S of the rotating-side sealing ring 4 of the slide component according to the sixth embodiment, and in the sixth embodiment, the depth of a fluid introduction groove 83 is only different from the third embodiment, and other configurations are the same as those in the third embodiment. Hereinafter, the same members as those in the third embodiment are denoted by the same numerals and symbols, and redundant descriptions will be omitted.

In FIG. 7, the sliding face S of the rotating-side sealing ring 4 includes the fluid introduction groove 83, the positive pressure generation groove 32 (the first pressure generation mechanism according to the present invention), and the spiral groove 31 (the second pressure generation mechanism according to the present invention). The positive pressure generation groove 32 and the fluid introduction groove 83 are arranged nearer the sealed fluid-side periphery 16 than the annular land portion R2, and the spiral groove 31 is arranged nearer the leakage-side periphery 15 than the annular land portion R2. In addition, the positive pressure generation groove 32 and the spiral groove 31 have the same configurations as the positive pressure generation groove 32 and the spiral groove 31 of the second embodiment, and therefore descriptions thereof will be omitted.

In FIG. 7, the fluid introduction groove 83 is formed into a triangular shape when viewed in the axial direction, and only an opening 83a is opened to the sealed fluid-side periphery 16. The fluid introduction groove 83 has the opening 83a in communication with the opening 32a of the positive pressure generation groove 32 and opened to the sealed fluid-side periphery 16, and an inclined wall part 83d facing the toe part 32e of the positive pressure generation groove 32 across the land portion R1. With respect to the radial axis r connecting the intersection point P of the inclined wall part 83d and the sealed fluid-side periphery 16 and the center O of the rotating-side sealing ring 4, the inclined wall part 83d is inclined to a direction to approach the opening 32a of the positive pressure generation groove 32. That is, the inclined wall part 83d is inclined to a direction in which the area of the fluid introduction groove 83 viewed in the axial direction is reduced. In addition, the depth of the fluid introduction groove 83 is set to the depth almost same as the positive pressure generation groove 32 and the spiral groove 31, and, for example, is set to around 0.1 to 10 μm.

The operation and effects of the thus configured slide component according to the sixth embodiment will be described. In addition, the operation and effects of the positive pressure generation groove 32 and the spiral groove 31 are same as the third embodiment, and therefore redundant descriptions will be omitted.

The fluid introduction groove 83 can easily take in the fluid, and therefore even when a fluid lubrication state is not sufficient in a low-speed rotation state such as at the starting time, it is possible to supply the fluid to the sliding face S and to contribute to lubrication of the sliding face S.

Moreover, the triangular fluid introduction groove 83 can be reduced in its radial width, and therefore it is possible to increase the overlapping portion Lp of the fluid introduction groove 83 and the positive pressure generation groove 32 even in a narrow space. In the embodiment of FIG. 7, by increasing the overlapping portion Lp and covering the fluid introduction groove 83 with the positive pressure generation groove 32 in a circumferential direction, the circumferential width CH of the leakage area can be made to zero, and the sealed fluid-side periphery 16 can be annularly surrounded. Further, the depth of the fluid introduction groove 83 is shallower than the fluid introduction groove 33 of the third embodiment, and therefore it is possible to further reduce the cross-sectional area of the leakage area. Thereby, even when the pumping action of the spiral groove 31 is deteriorated as at the reverse rotation, it is possible to restrict the fluid from flowing out to the leakage side through the leakage area from the sealed fluid side and thus it is possible to improve sealing performance.

Seventh Embodiment

Figure 8:
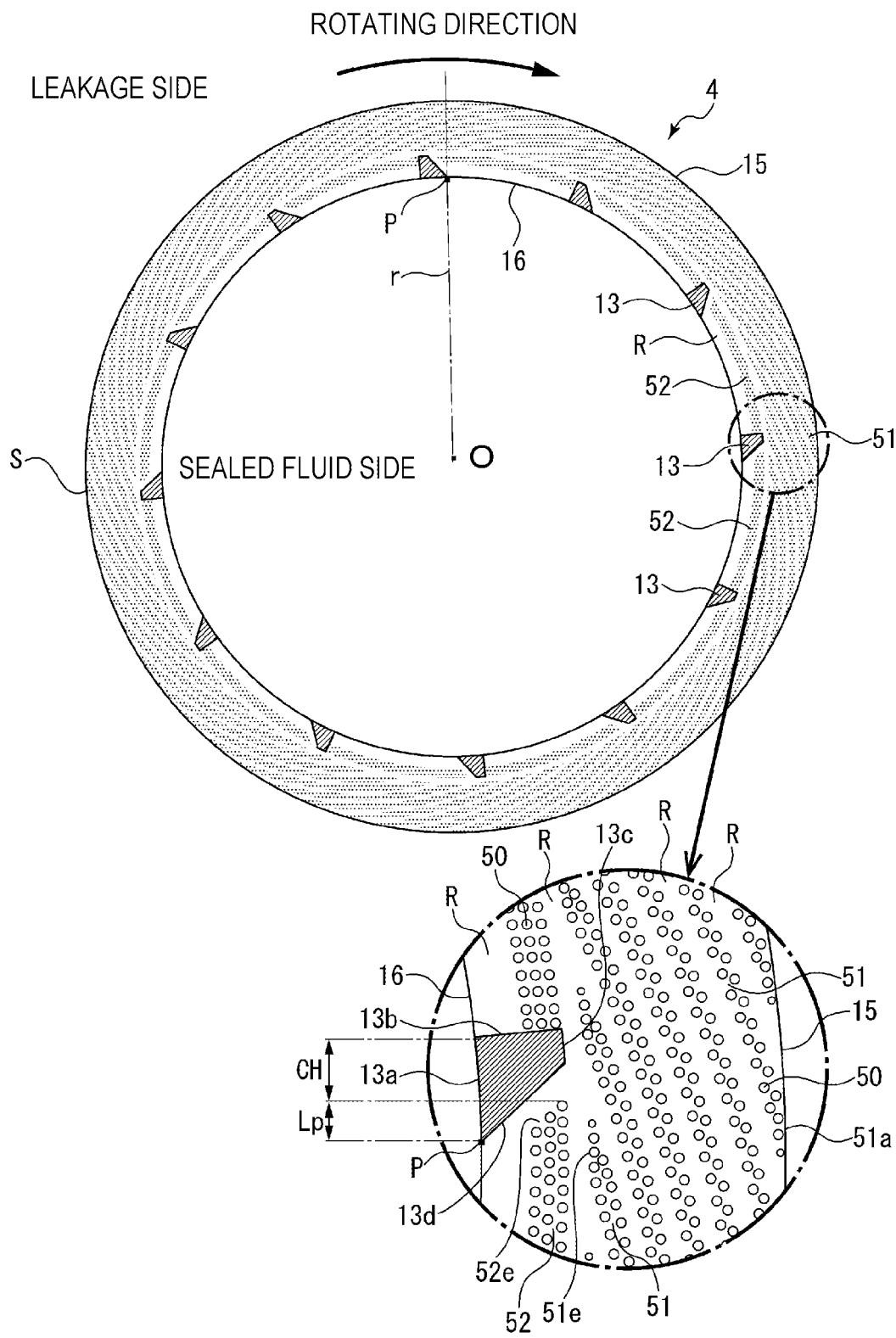
FIG. 8 is a drawing showing the sliding face of the rotating-side sealing ring of a seventh embodiment taken along the arrow W-W in FIG. 1.
Figure 9:
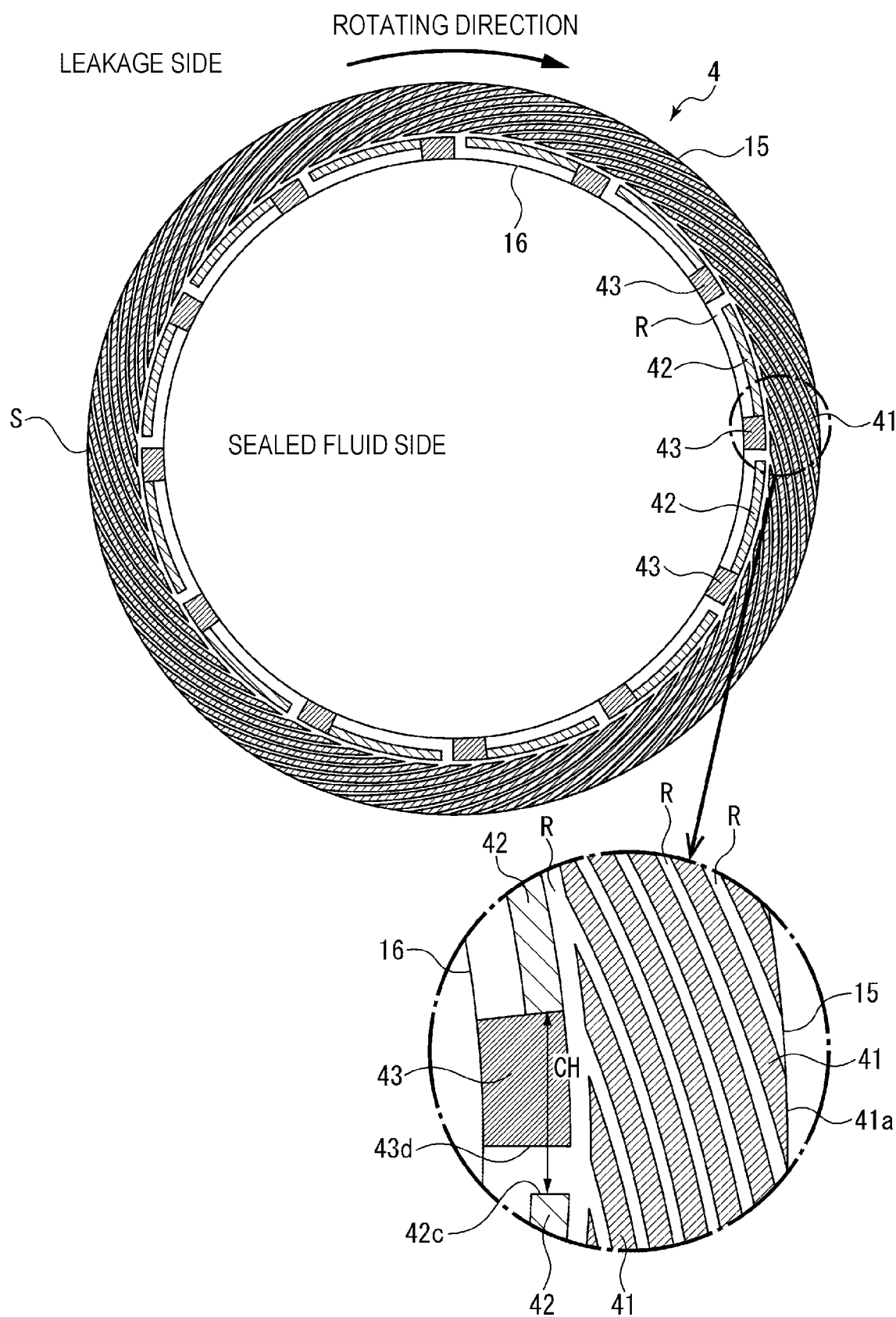
FIG. 9 is a drawing showing the sliding face of the rotating-side sealing ring of a conventional embodiment.

The slide component according to a seventh embodiment of the present invention will be described. FIG. 8 shows the sliding face S of the seventh embodiment. In the first to the sixth embodiments, the first pressure generation mechanism and the second pressure generation mechanism are configured by the grooves, but in the seventh embodiment, the first pressure generation mechanism and the second pressure generation mechanism are configured by a dimple group consisting of an aggregate of dimples. Hereinafter, the same members as those in the first embodiment are denoted by the same numerals and symbols, and redundant descriptions will be omitted.

In FIG. 8, the sliding face S of the rotating-side sealing ring 4 includes the fluid introduction groove 13, a first pressure generation mechanism 52, and a second pressure generation mechanism 51, the fluid introduction groove 13 and the first pressure generation mechanism 52 are arranged nearer the sealed fluid-side periphery 16 than the annular land portion R2, and the second pressure generation mechanism 51 is arranged nearer the leakage-side periphery 15 than the annular land portion R2. In addition, the fluid introduction groove 13 has the same configuration as the fluid introduction groove 13 of the first embodiment.

The first pressure generation mechanism 52 consists of a dimple group formed by arranging a plurality of dimples 50 adjacent to each other into an arc having a predetermined length. The dimple 50 is a dent having an opening surrounded by the land portion R1. The dimple group is a pseudo flow passage in which the plurality of dimples 50 are arranged adjacent to each other so as to have a desired groove shape by providing the land portions R1 around the dimples 50 such that the dimples 50 are not in communication with each other. One end of the first pressure generation mechanism 52 consisting of the dimple group is in communication with the fluid introduction groove 13, and the other end thereof is a closed end part 52e surrounded by the land portion R1. In addition, the diameter of the opening of the dimple is set to 10 μm to 100 μm, and the depth of a bottom of the dimple 50 is set to around 10 μm to 100 μm. The dimples arranged on the sliding face S may be set to the approximately same opening diameter and depth, but may be set to different opening diameter and depth found in a predetermined range.

By relative sliding of the rotating-side sealing ring 4 and the stationary-side sealing ring 7, the fluid is sucked in the dimples 50, is increased in pressure within the dimples 50, and is discharged from the dimples 50. Then, when the dimples 50 are arranged adjacent to each other, even if the dimples 50 are not in communication with each other, suction and discharge operations of the fluid by the dimples 50 are successively performed among the adjacent dimples 50. Thereby, when the dimple group is configured by arranging the dimples 50 into a groove form, the fluid flows along the groove-like dimple group, and the dimple group functions as a pseudo flow passage.

The second pressure generation mechanism 51 is a dimple group formed into a spiral shape by arranging the dimples 50 adjacent to each other. The second pressure generation mechanism 51 is configured by alternately arranging a predetermined number (sixty in the example of FIG. 5) of the dimple groups and the land portions R3 in a circumferential direction. Moreover, the second pressure generation mechanism 51 has an opening 51a at one end and a closed end part 51e at the other end, the opening 51a is in communication with the leakage-side periphery 15, and the closed end part 51e is surrounded by the annular land portion R2 and closed.

As shown in FIG. 8, when the rotating-side sealing ring 4 is rotated in a clockwise direction, the fluid is drawn into the first pressure generation mechanism 52 in communication with the fluid introduction groove 13, and the fluid flows along the first pressure generation mechanism 52, is dammed in the vicinity of closed end part 52e, and generates dynamic pressure (positive pressure). Moreover, the spiral-shaped second pressure generation mechanism 51 pumps the fluid into the dimple group through the opening 51a in communication with the leakage-side periphery 15, and the pumped fluid flows along the spiral-shaped dimple group, and generates dynamic pressure (positive pressure) in the vicinity of the closed end part 51e. By the dynamic pressure (positive pressure), the gap between the sliding faces S of the rotating-side sealing ring 4 and the stationary-side sealing ring 7 is increased, and the sliding faces S are brought into a fluid lubrication state to have very low friction.

The fluid introduction groove 13 and the closed end part 52e of the first pressure generation mechanism 52 form the overlapping portion Lp where they circumferentially overlap. By providing the overlapping portion Lp, it is possible to reduce the gap between the adjacent first pressure generation mechanisms 52, that is, the circumferential width CH of the leakage area and to narrow the leakage area. Thereby, even if the pumping action by the second pressure generation mechanism 51 is deteriorated as at the reverse rotation (rotating in a counterclockwise direction), it is possible to restrict the fluid from flowing out to the leakage side through the leakage area from the sealed fluid side and thus it is possible to improve sealing performance.

Hereinbefore, although the embodiments of the present invention have been described by the drawings, its specific configuration is not limited to these embodiments, and any changes and additions made without departing from the scope of the present invention are included in the present invention.

In the above embodiments, the case where a plurality of first pressure generation mechanisms and second pressure generation mechanisms are provided has been described, but the present invention is not limited thereto. For example, if the size of the rotating-side sealing ring and the stationary-side sealing ring is small, the number of the first pressure generation mechanisms and the second pressure generation mechanisms may be one respectively. The number and shape of the first pressure generation mechanisms and the second pressure generation mechanisms can be changed depending on the use conditions.

In the above embodiments, although the fluid introduction groove, the first pressure generation mechanism, and the second pressure generation mechanism are provided in the rotating-side sealing ring, the fluid introduction groove, the first pressure generation mechanism, and the second pressure generation mechanism may be provided in the stationary-side sealing ring, or may be provided in the rotating-side sealing ring and the stationary-side sealing ring.

REFERENCE SIGNS LIST 1 mechanical seal
2 rotating shaft
3 sleeve
4 rotating-side sealing ring
5 housing
7 stationary-side sealing ring
8 coiled wave spring
11 spiral groove (second pressure generation mechanism)
11a opening (one end of second pressure generation mechanism)
11e closed end part (the other end of second pressure generation mechanism)
12 positive pressure generation groove (first pressure generation mechanism)
12a opening (one end of first pressure generation mechanism)
12e toe part (the other end of first pressure generation mechanism)
13 fluid introduction groove
13a opening
15 leakage-side periphery
16 sealed fluid-side periphery
21 spiral groove (second pressure generation mechanism)
21a opening (one end of second pressure generation mechanism)
21e closed end part (the other end of second pressure generation mechanism)
22 positive pressure generation groove (first pressure generation mechanism)
22a opening (one end of first pressure generation mechanism)
22e toe part (the other end of first pressure generation mechanism)
23 fluid introduction groove
23a opening
31 spiral groove (second pressure generation mechanism)
31a opening (one end of second pressure generation mechanism)
31e closed end part (the other end of second pressure generation mechanism)
32 positive pressure generation groove (first pressure generation mechanism)
32a opening (one end of first pressure generation mechanism)
32e toe part (the other end of first pressure generation mechanism)
33 fluid introduction groove
33a opening
50 dimple
51 second pressure generation mechanism (dimple group)
51a opening (one end of second pressure generation mechanism)

51e closed end part (the other end of second pressure generation mechanism)
52 first pressure generation mechanism (dimple group)
52e toe part (the other end of first pressure generation mechanism)
CH width of leakage area
Lp overlapping portion
R1 land portion
R2 annular land portion
R3 land portion
S sliding face

The invention claimed is:

1. A pair of slide components that slide relative to each other, wherein:
the pair of slide components have sliding faces that slide relative to each other, a sealed fluid-side periphery, and a leakage-side periphery,
the sliding face of at least one slide component of the pair of slide components includes: a fluid introduction groove in communication with the sealed fluid-side periphery;
a first pressure generation mechanism of which one end is in communication with the fluid introduction groove and an other end is surrounded by a land portion; and
a second pressure generation mechanism of which one end is in communication with the leakage-side periphery and an other end is surrounded by an annular land portion, and
the fluid introduction groove and the other end of the first pressure generation mechanism include overlapping portions overlapping circumferentially, wherein
the fluid introduction groove has an inclined wall part facing the other end of the first pressure generation mechanism; and
the inclined wall part is inclined to a direction to approach the one end of the first pressure generation mechanism with respect to a radial axis connecting an intersection point of the inclined wall part and the sealed fluid-side periphery and a center of one of the slide components.

2. The slide component according to claim 1, wherein the fluid introduction groove and the first pressure generation mechanism are arranged nearer the sealed fluid-side periphery than the annular land portion.

3. The slide component according to claim 1, wherein the fluid introduction groove is formed into a trapezoidal shape.

4. The slide component according to claim 1, wherein the fluid introduction groove is formed into a triangular shape.

5. The slide component according to claim 1, wherein the first pressure generation mechanism consists of a groove part.

6. The slide component according to claim 1, wherein the first pressure generation mechanism consists of a dimple group consisting of a plurality of dimples.

7. The slide component according to claim 1, wherein the second pressure generation mechanism consists of a groove part.

8. The slide component according to claim 1, wherein the second pressure generation mechanism consists of a dimple group consisting of a plurality of dimples.

9. The slide component according to claim 1, wherein the second pressure generation mechanism is formed into a spiral shape.

10. The slide component according to claim 1, wherein the depth of the fluid introduction groove is deeper than the depth of the first pressure generation mechanism.

11. The slide component according to claim 1, wherein the depth of the fluid introduction groove is same as the depth of the first pressure generation mechanism.

* * * * *